US011916872B2

(12) United States Patent
Couillard et al.

(10) Patent No.: US 11,916,872 B2
(45) Date of Patent: Feb. 27, 2024

(54) INTEGRATED NETWORK SECURITY APPLIANCE, PLATFORM AND SYSTEM

(71) Applicant: CRYPTO4A TECHNOLOGIES INC., Gatineau (CA)

(72) Inventors: Bruno Couillard, Gatineau (CA); Bradley Clare Ritchie, Kemptville (CA); James Ross Goodman, Ottawa (CA); Jean-Pierre Fiset, Ottawa (CA)

(73) Assignee: CRYPTO4A TECHNOLOGIES INC., Gatineau (CA)

( * ) Notice: Subject to any disclaimer, the term of this patent is extended or adjusted under 35 U.S.C. 154(b) by 0 days.

(21) Appl. No.: 17/659,647

(22) Filed: Apr. 18, 2022

(65) Prior Publication Data

US 2022/0247723 A1 Aug. 4, 2022

Related U.S. Application Data

(63) Continuation of application No. 16/697,857, filed on Nov. 27, 2019, now Pat. No. 11,310,198, which is a
(Continued)

(51) Int. Cl.
*H04L 9/40* (2022.01)
*H04L 9/08* (2006.01)

(52) U.S. Cl.
CPC ........ *H04L 63/0209* (2013.01); *H04L 9/0877* (2013.01); *H04L 63/0485* (2013.01)

(58) Field of Classification Search
CPC ............... H04L 63/0209; H04L 9/0877; H04L 63/0485; H04L 2209/12; H04L 9/0897;
(Continued)

(56) References Cited

U.S. PATENT DOCUMENTS 5,088,091 A 2/1992 Schroeder
5,521,909 A 5/1996 Holloway
(Continued)

FOREIGN PATENT DOCUMENTS

WO WO 2007/010333 1/2007
WO WO 2016/099644 6/2016

OTHER PUBLICATIONS

Written Opinion of the International Searching Authority in PCT/CA2019/051638 dated Mar. 17, 2020 in 4 pages.
(Continued)

*Primary Examiner* — Quazi Farooqui
(74) *Attorney, Agent, or Firm* — Knobbe, Martens, Olson & Bear, LLP

(57) ABSTRACT

Described are various embodiments of an integrated network appliance and system. In one embodiment, the appliance comprises: a hardware-integrated processing engine operable to implement a trusted network-related resource; an integrated digital data processor operable to execute said processing engine; an integrated data storage resource accessible to said processing engine to implement said trusted network-related resource; an integrated location sensor; and an embedded hardware security module (HSM) hardwired to interface with said hardware-integrated processing engine via a dedicated hardware-isolated communication path, and operable to execute a trusted internal cryptographic process associated with said trusted network-related resource as a function of location data output from said integrated location sensor.

11 Claims, 19 Drawing Sheets

Related U.S. Application Data continuation-in-part of application No. PCT/CA2018/050635, filed on May 30, 2018.

(60) Provisional application No. 62/772,953, filed on Nov. 29, 2018, provisional application No. 62/532,138, filed on Jul. 13, 2017, provisional application No. 62/513,103, filed on May 31, 2017.

(58) Field of Classification Search
CPC ... H04L 9/40; H04L 9/08; G06F 21/44; G06F 21/606; G06F 21/74; G06F 21/87; G06F 2221/2113; G09C 1/00
See application file for complete search history.

(56) References Cited

U.S. PATENT DOCUMENTS

| | | | |
|---|---|---|---|
| 8,160,244 B2 | 4/2012 | Buer | |
| 8,572,673 B2 | 10/2013 | Duffy | |
| 8,631,247 B2 | 1/2014 | O'Loughlin | |
| 8,782,767 B2 | 7/2014 | Hill | |
| 8,826,039 B2 | 9/2014 | Chou | |
| 9,071,446 B2 | 6/2015 | Kreft | |
| 9,183,158 B2 | 11/2015 | O'Loughlin | |
| 9,355,279 B1 | 5/2016 | Takahashi | |
| 9,355,280 B2 | 5/2016 | Chou | |
| 9,461,826 B2 | 10/2016 | Kreft | |
| 9,524,399 B1 | 12/2016 | Takahashi | |
| 9,571,279 B2 | 2/2017 | Hussain | |
| 9,674,158 B2 | 6/2017 | Korondi | |
| 9,678,896 B2 | 6/2017 | O'Loughlin | |
| 9,864,874 B1 | 1/2018 | Shanbhag et al. | |
| 9,893,898 B2 | 2/2018 | Kreft | |
| 10,445,509 B2 | 10/2019 | Thota et al. | |
| 10,491,569 B1 | 11/2019 | Powell, III | |
| 10,587,450 B1 | 3/2020 | Hartley et al. | |
| 10,708,236 B2 | 7/2020 | Takahashi | |
| 10,778,641 B2 | 9/2020 | Bond | |
| 2005/0246529 A1 | 11/2005 | Hunt et al. | |
| 2006/0059372 A1 | 3/2006 | Fayar | |
| 2006/0072748 A1 | 4/2006 | Buer | |
| 2006/0072762 A1 | 4/2006 | Buer | |
| 2007/0192629 A1 | 8/2007 | Saito | |
| 2008/0216147 A1 | 9/2008 | Duffy | |
| 2008/0307499 A1 | 12/2008 | Hill | |
| 2009/0158050 A1 | 6/2009 | Quintana et al. | |
| 2011/0010720 A1 | 1/2011 | Smith et al. | |
| 2011/0191599 A1 | 8/2011 | Chou | |
| 2012/0102334 A1 | 4/2012 | O'Loughlin | |
| 2012/0151223 A1* | 6/2012 | Conde Marques | G06F 21/6218 713/193 |
| 2012/0166576 A1 | 6/2012 | Orsini | |
| 2012/0166806 A1 | 6/2012 | Zhang | |
| 2013/0061310 A1 | 3/2013 | Whitmyer | |
| 2013/0219164 A1 | 8/2013 | Hamid | |
| 2014/0010371 A1 | 1/2014 | Khazan et al. | |
| 2014/0108786 A1 | 4/2014 | Kreft | |
| 2014/0108825 A1 | 4/2014 | O'Loughlin | |
| 2015/0052367 A1 | 2/2015 | Chou | |
| 2015/0161415 A1 | 6/2015 | Kreft | |
| 2015/0227932 A1 | 8/2015 | Huxham et al. | |
| 2015/0229614 A1 | 8/2015 | Thompson | |
| 2015/0358161 A1 | 12/2015 | Hussain | |
| 2015/0358294 A1 | 12/2015 | Kancharla | |
| 2015/0358311 A1 | 12/2015 | Kancharla | |
| 2015/0358312 A1 | 12/2015 | Kancharla | |
| 2015/0358313 A1 | 12/2015 | Hussain | |
| 2016/0019050 A1* | 1/2016 | Marr | G06F 8/65 717/172 |
| 2016/0028551 A1 | 1/2016 | Hussain | |
| 2016/0048462 A1 | 2/2016 | O'Loughlin | |
| 2016/0105429 A1 | 4/2016 | Boenisch | |
| 2016/0149877 A1 | 5/2016 | Kancharla | |
| 2016/0359635 A1 | 12/2016 | Kreft | |
| 2016/0359636 A1 | 12/2016 | Kreft | |
| 2017/0034133 A1 | 2/2017 | Korondi | |
| 2017/0075821 A1 | 3/2017 | Takahashi | |
| 2017/0090007 A1* | 3/2017 | Park | H04W 4/021 |
| 2017/0213218 A1 | 7/2017 | Pickering | |
| 2017/0244678 A1 | 8/2017 | Korondi | |
| 2017/0346623 A1 | 11/2017 | Bill et al. | |
| 2017/0351879 A1 | 12/2017 | Sion | |
| 2018/0004953 A1* | 1/2018 | Smith, II | H04L 9/3268 |
| 2018/0091311 A1 | 3/2018 | Kisley et al. | |
| 2018/0167204 A1 | 6/2018 | Wall | |

OTHER PUBLICATIONS

International Search Report in PCT/CA2019/051638 dated Mar. 17, 2020 in 3 pages.
Lubos Gaspar et al. HCrypt: A Novel Concept of Cyypto-Processor with Secured Key Management, Dec. 12, 2010, pp. 280-285.
International Search Report dated Sep. 12, 2018 for International Application No. PCT/CA2018/050630, 5 pages.
Written Opinion of the International Searching Authority dated Sep. 12, 2018 for International Application No. PCT/CA2018/050630, 8 pages.
CryptoServer Se-Series Gen2, Non-Proprietary Security Policy, Document No. 2014-0001, Version: 1.2.0, Jan. 4, 2017, Ultimaco IS GmbH, Germany.
FIPS 140-2 Level 3 Non-Proprietary Security Policy NITROXIII CNN35XX-NFBE HSM Family, Version 2.0.5, Mar. 30, 2017, Cavium.
International Search Report dated Aug. 9, 2018 for International Application No. PCT/CA2018/050635, 3 pages.
Written Opinion of the International Searching Authority dated Aug. 27, 2018 for International Application No. PCT/CA2018/050635, 8 pages.
Level 3 Non-Proprietary Security Policy for Luna(R) PCI-E Cryptographic Module and Luna(R) PCI-E Cryptographic Module for Luna(R) SA, 002-500004-001, Revision 20, Aug. 10, 2015, pp. 1-46, SafeNet Assured Technologies, LLC.
SafeNet Network HSM (Formely SafeNet Luna SA), Product Brief, Jan. 29, 2016, pp. 1-2, Gemalto.
Securing Network-Attached HSMs: The SafeNet Luna SA Three-Layer Authentification Model White Paper, 2010, pp. 1-9, Gemalto.
Thales nShield HSM Security Policy, Version 4.6, May 3, 2016, Thales UK Limited and Thales e-Security.
Itra Electronics AEP's Advanced Configurable Cryptographic Environment (ACCE) v3 HSM Crypto Module, FIPS 140-2 Non-Proprietary Security Policy Issue 23, 2017, pp. 1-37, Ultra Electronics AEP.
Network Segmentation in Virtualized Environments, VMWARE, Best Practices, Revision: May 19, 2009 (2009), https://www.vmware.com/content/dam/digitalmarketing/vmware/en/pdf/techpaper/network_segmentation.pdf.

* cited by examiner

INTEGRATED NETWORK SECURITY APPLIANCE, PLATFORM AND SYSTEM

FIELD OF THE DISCLOSURE

The present disclosure relates to communication networks and devices and, in particular, to an integrated network appliance, platform and system.

BACKGROUND

Multi-level network architectures are commonly deployed, for instance, where disparate networking resources are required to establish particular network data paths across and particularly between network zones and/or interfaces in order to deliver a particular service or application. Physical separation between network resources is also commonplace in high security implementations, for example, where physically isolated network security zones may be required to secure back end resources for instance deployed in a high security zone from public and/or low security authorized user zones. In some high security installations, the establishment of physically isolated networking devices/appliances is in fact a requirement to satisfy security compliance standards beyond basic commercial networking standards, such as described in the Federal Information Processing Standard (FIPS 140-2) document published by the United States National Institutes of Standards and Technology (NIST), for example, and above. Accordingly, a network security zoning architecture may be invoked to physically separate a high security zone in which a sensitive restricted-access database or application server is implemented, from a public access zone operated in accordance with reduced access security standards so to allow greater user access and operation.

Generally, a multi-level network architecture, such as a network security zoning architecture, will take the form of a stack of distinct network-enabled devices, interconnected in accordance with a designated operational network design via a series of corresponding physical network interface controllers and cables, to relay data, commands and instructions over a set of established (secured) data channels. In doing so, reasonable security strength can be achieved by virtue of the respective physical segregation of the externally interconnected networking devices, though network tampering may nonetheless result from physical reconnection of the subject devices, unauthorized local access via external physical connection to one or more of the subject devices, introduction of an unauthorized hacking device, or again by unauthorized reallocation of software-defined ports and/or data channels on tampered or otherwise compromised devices, to name a few examples. It is therefore considered critical to also ensure the physical security of such architectures.

Alternative solutions to physically segregated network devices may include the virtualization of certain network resources through software so as to combine multiple such resources on a same networking device or appliance. Accordingly, rather than to physically interconnect networking devices as above, a set of virtual network interface controllers may be configured in software to define appropriate virtual interfaces between the various network components virtualized on a same physical device. In the context of network security zoning, system designers may seek to at least partially collapse a given network zoning architecture into one or more virtualization zones (e.g. physically segregated zone-by-zone virtualization or physically aggregated zone virtualizations—see for example, Network Segmentation in Virtualized Environments by vmware: https://www.vmware.com/content/dam/digitalmarketing/vmware/en/pdf/techpaper/network_segmentation.pdf). Contrary to its physical implementation, a virtualized zoning architecture will interconnect virtualized servers via virtual switches, network interface controllers and the like to reduce required hardware. In doing so, the system becomes easier to implement and customize through software management applications, but also becomes more vulnerable to misconfigurations of, or tampering with, the virtualized system components, which may result in loss of zone isolations and/or data breaches This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for an integrated multi-level or cross-domain network security appliance and system, and remote management system and method therefor, that overcome some of the drawbacks of known techniques, or at least, provides a useful alternative thereto. Some aspects of this disclosure provide examples of such systems and methods.

In accordance with one aspect, there is provided an integrated multi-level network appliance comprising: two or more hardware-integrated processing engines each operable to implement a corresponding network-related resource associated with a respective network level in accordance with a designated multi-level network architecture; one or more integrated digital data processors operable to execute said processing engines; one or more integrated data storage resources accessible to said processing engines to implement each said corresponding network-related resource; and a trusted single-chip switch having a plurality of hardware ports associated therewith and configured to define in hardware multiple data communication paths embedded therein; wherein each of said processing engines interfaces with at least one of said hardware ports in hardware so to route processing engine traffic therethrough along selected ones of said embedded communication paths to operatively interconnect said processing engines across network architecture levels through internal integrated hardware network connections.

In one embodiment, the integrated appliance further comprises a tamper-resistant housing in which each of said processing engines, said data processors, said storage resources and said switch are operatively housed.

In one embodiment, the switch further comprises one or more channel data processing resources embedded therein to integrally operate on said processing engine traffic along at least one of said communication paths.

In one embodiment, each of said one or more channel data processing resources comprise an embedded hardware security module (HSM) hardwired to interface with at least one of said hardware ports to electronically receive input hardware port-specific cryptographic data thereon to initiate execution of an internal cryptographic process as a function thereof via an embedded cryptographic engine thereof.

In one embodiment, each of said one or more channel data processing resources comprise an embedded hardware security module (HSM) hardwired to interface with at least two of said hardware ports, each one of which operable to electronically receive given input hardware port-specific cryptographic data thereon to initiate execution of an internal cryptographic process as a function thereof; wherein said HSM comprises: two or more segregated hardware port-specific storage spaces each operatively linked to a corresponding one of said at least two hardware ports via a corresponding hardware link, and storing respective secured hardware port-specific cryptographic data thereon exclusively retrievable as a function of said given input hardware port-specific cryptographic data corresponding thereto; and a cryptographic engine operable to execute said cryptographic process based on said secured port-specific cryptographic data retrieved from said segregated hardware port-specific storage media as a function of said given input port-specific cryptographic data In one embodiment, said HSM is operable as a multi-level HSM wherein said at least two hardware ports are respectively associated with one said respective network level.

In one embodiment, each said respective network level corresponds to a distinct network security zone.

In one embodiment, the one or more channel data processing resources comprise one or more of an inline channel cryptographic resource, a data channel filter resource, a data channel comparator resource, a data channel sniffer resource or a data channel diode resource.

In one embodiment, said one or more communication channel resources comprise an inline channel encryption resource executed distinctly from said cryptographic engine.

In one embodiment, the cryptographic engine is operable to execute a control plane cryptographic process, whereas said inline channel encryption resource is operable to execute a communication plane cryptographic process subsequent to successful execution of said control plane cryptographic process.

In one embodiment, the control plane cryptographic process comprises a new session initiation process invoking a private key stored in said segregated port-specific storage space, whereas said communication plane cryptographic process comprises an in-session cryptographic process invoking a distinct session key.

In one embodiment, the cryptographic engine comprises distinct hardware port-specific cryptographic engines.

In one embodiment, each of said distinct hardware port-specific cryptographic engines is associated with a corresponding one of said segregated hardware-port specific storage spaces.

In one embodiment, the corresponding one of said segregated hardware-port specific storage spaces is exclusively accessible via a hardware link operatively defined through said associated one of said distinct hardware port-specific cryptographic engines.

In one embodiment, at least some said corresponding hardware link is implemented via common embedded hardware logic.

In one embodiment, the two or more-segregated hardware port-specific storage spaces comprise one or more externally integrated hardware storage resources.

In one embodiment, the switch is implemented in a field-programmable gate array (FPGA).

In one embodiment, the switch is reconfigurable to reconfigure one or more of said embedded data communication paths.

In one embodiment, the switch is remotely reconfigurable.

In one embodiment, the integrated appliance further comprises a common external administration interface to provide authorised external access to distinct appliance resources in accordance with a designated multi-tier authorisation protocol, wherein selective access to designated ones of said appliance resources is provided via said administration interface as a function of distinctly defined administrator access authentication profiles.

In one embodiment, the designated multi-tier authorisation protocol defines distinct administrative access permissions for said switch and at least one of said processing engines.

In one embodiment, the processing engines are operable to respectively implement an outer virtual private network (VPN) and an inner VPN in accordance with a designated multi-level VPN architecture.

In one embodiment, the processing engines are operable to respectively implement a digital entropy source and an entropy service engine.

In one embodiment, the processing engines are operable to respectively implement hardware isolated ingress and egress processing resources to isolate ingress and egress network traffic between distinctly integrated network security zones.

In accordance with another aspect, there is provided an integrated network security zoning appliance operable to implement a network architecture having distinct network security zones, the appliance comprising: two or more hardware-integrated processing engines each operable to implement a corresponding network-related resource associated with a respective one of the network security zones; one or more integrated digital data processors operable to execute said processing engines; one or more integrated data storage resources accessible to said processing engines to implement each said corresponding network-related resource; and an integrated multi-zone hardware security module (HSM) having a plurality of hardware ports associated therewith and configured to define in hardware multiple data routing paths embedded therein and operatively interconnecting said hardware ports; wherein said HSM is hardwired via respective ones of said hardware ports to interface with respective ones of said processing engines to electronically receive input zone-specific cryptographic data therefrom to initiate execution of an internal cryptographic process as a function thereof via a cryptographic engine associated therewith.

In one embodiment, the HSM comprises two or more segregated hardware port-specific storage spaces each operatively linked to a corresponding one of said hardware ports via a corresponding hardware link, and storing respective secured zone-specific cryptographic data thereon exclusively retrievable as a function of said given input zone-specific cryptographic data corresponding thereto; and said cryptographic engine is operable to execute said cryptographic process based on said secured zone-specific cryptographic data retrieved from said segregated hardware port-specific storage media as a function of said given input zone-specific cryptographic data.

In one embodiment, the HSM is implemented in a field-programmable gate array (FPGA).

In one embodiment, the appliance further comprises a tamper-resistant housing in which each of said processing engines, said data processors, said storage resources and said HSM are operatively housed.

In one embodiment, the HSM comprises one or more channel data processing resources embedded therein to operate on at least one of said routing paths.

In one embodiment, said one or more channel data processing resources one or more of an inline channel cryptographic resource, a data channel filter resource, a data channel comparator resource, a data channel sniffer resource or a data channel diode resource.

In one embodiment, the appliance further comprises a common external administration interface to provide authorised external access to distinct zone resources in accordance with a designated multi-tier authorisation protocol, wherein selective access to designated ones of said zones is provided via said administration interface as a function of distinctly defined administrator access authentication profiles.

In one embodiment, the designated multi-tier authorisation protocol further defines a distinct administrative access permission for said HSM.

In accordance with one aspect, there is provided a cross-domain network traffic management appliance comprising: an external hardware network domain port to interface with an external network corresponding with a first network security domain, and exchange domain-specific data therethrough; a cross-domain hardware port to interface with a second network security domain and exchange cross-domain data therethrough; one or more hardware-integrated processing engines; and a hardware-integrated interconnection matrix configured to define, in hardware, designated data communication paths to interconnect said processing engines; wherein said one or more hardware-integrated processing engines are operable to: process and validate ingress first domain data received from said first network security domain via said external hardware port for cross-domain egress via said cross-domain hardware port; and process cross-domain ingress data received via said cross-domain hardware port for dispatch to said first network security domain via said external hardware network port; cross-domain egress and ingress data is internally encrypted and decrypted, respectively, in accordance with a designated destination-domain encryption process.

In one embodiment, the cross-domain egress and ingress data is respectively encrypted or decrypted by a hardware-integrated encryption engine.

In one embodiment, the hardware-integrated encryption engine is operatively associated with a plurality of hardware security module (HSM) ports distinctly addressable via said respective hardware paths of said interconnection matrix to respectively encrypt said cross-domain egress data and decrypt said cross-domain ingress data.

In one embodiment, the respective hardware paths of said interconnection matrix physically segregates ingress and egress cross-domain data paths.

In one embodiment, the appliance further comprises a distinctly addressable hardware-integrated administrative engine operable to securely manage operation of said two or more hardware-integrated processing engines.

In one embodiment, the appliance further comprises an external hardware security network port distinctly addressable by one of said hardware-integrated processing engines to invoke an external validation process to be applied to said ingress domain-specific data prior to encryption for cross-domain egress.

In one embodiment, the hardware-integrated processing engines comprise a domain-specific protocol adapter operable to interface with said external network domain port, a cross-domain data validation engine operable to validate said ingress domain-specific data once processed by said protocol adapter, and a cross-domain access portal operable to interface with said cross-domain hardware port.

In one embodiment, the interconnection matrix defines a one-way hardware data path between said protocol adapter and said cross-domain access portal via said cross-domain data validation engine to process said ingress first domain data, and a distinct hardware data path between said cross-domain access portal and said protocol adapter to process said cross-domain ingress data.

In one embodiment, the cross-domain hardware port comprises an external cross-domain port to be operatively interfaced with a corresponding external cross-domain hardware port of a corresponding cross-domain network traffic management appliance operatively associated with said second network security domain.

In one embodiment, the cross-domain hardware port comprises an internal cross-domain port operatively interfacing with a corresponding internal cross-domain hardware port operatively associated with said second network security domain.

In one embodiment, the cross-domain hardware port is configured to operatively interface with a secure interconnection network operatively interconnecting respective cross-domain hardware ports associated with respective network security domains to securely transfer encrypted cross-domain data therebetween.

In one embodiment, the cross-domain hardware port is operable to interface with multiple distinct second network security domains and exchange distinct destination domain-specific data therewith.

In accordance with another aspect, there is provided a cross-domain network traffic management system comprising: a plurality of hardware data path layers, each one of which corresponding with a designated network security domain and comprising: an external hardware network domain port to interface with an external network corresponding with a given network security domain, and exchange domain-specific data therethrough; a cross-domain hardware port to interface with distinct hardware data path layers corresponding with distinct network security domains and exchange cross-domain data therethrough; or more hardware-integrated processing engines; and a hardware-integrated interconnection matrix configured to define, in hardware, designated data communication paths to interconnect said processing engines; wherein said hardware-integrated processing engines are operable to: process and validate ingress given domain data received from said given network security domain via said external hardware port for cross-domain egress via said cross-domain hardware port; and process cross-domain ingress data received via said cross-domain hardware port for dispatch to said given network security domain via said external hardware network port; wherein cross-domain egress and ingress data is internally encrypted and decrypted, respectively, in accordance with a respectively designated destination-domain encryption process.

In one embodiment, each said cross-domain hardware port operatively interfaces with a secure interconnection network to securely transfer encrypted cross-domain data thereon.

In accordance with another aspect, there is provided a multi-zone network traffic management system or appliance comprising: one or more hardware-integrated processing engines operable to implement one or more network security management processes associated with a respective network security zone; and a trusted hardware interconnection matrix having a plurality of hardware ports associated therewith and configured to define in hardware multiple data communication paths embedded therein exclusively interconnecting said network security zones via respective hardware paths thereof that integrally invoke, in hardware, said network security management processes; wherein a given data transaction is routed in hardware via a designated hardware path of said interconnection matrix to operatively invoke a given network security management process, upon successful execution of which, said given data transaction is successfully relayed to a distinct zone via a distinct one of said hardware paths, such that said network security process is integrally invoked in hardware to process network transactions between said zones.

In one embodiment, the network security management processes comprise a transaction auditing process.

In one embodiment, the network transaction is relayed, encrypted, to said distinct zone, and only successfully decrypted therein upon successful execution of said given network security management process.

In one embodiment, the security management process, upon successful execution thereof, releases a decryption key to successfully decrypt said relayed network transaction.

In one embodiment, the given network security management process, upon successful execution thereof, locally decrypts said given network transaction to be relayed to said distinct zone accordingly.

In one embodiment, the one or more network security management processes comprise a cryptographic process; and said one or more hardware-integrated processing engines comprise a cryptographic engine hardwired to interface with said hardware ports to execute each said cryptographic process.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
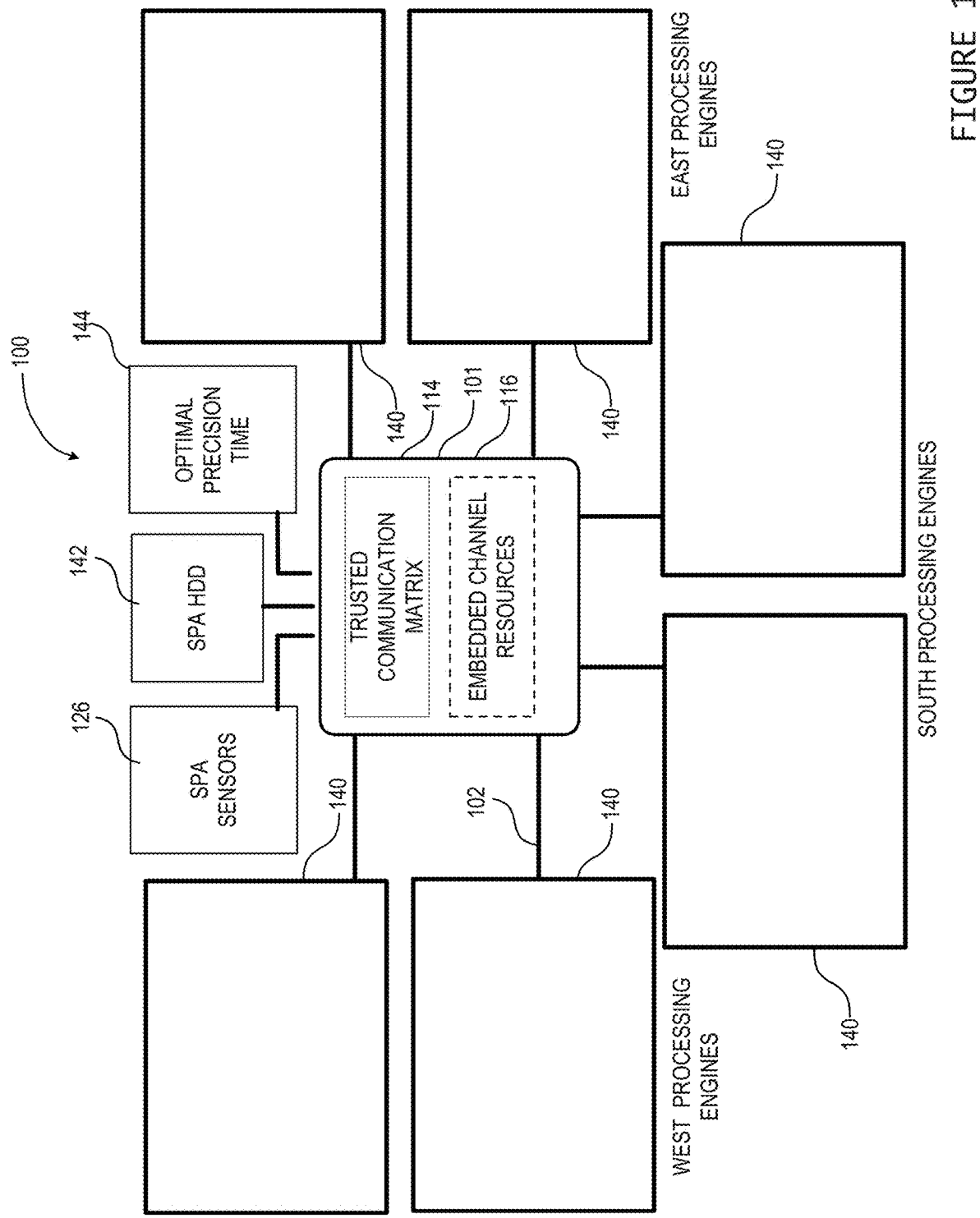
FIG. 1 is a schematic diagram of an integrated multi-level network appliance, in accordance with one embodiment, having a trusted communication matrix or intelligent switch embedded therein, and optionally having one or more embedded channel resources accessible thereto.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods as described herein provide, in accordance with different embodiments, examples in which a multi-level network security management device can be utilized to securely control the passage of data/transactions from one network (security) zone, domain or level, to another while minimizing tampering opportunities and/or fraudulent use. For example, embodiments as described herein may be configured to securely relay data or transactions, in a common hardware infrastructure, from one network security zone to another, for instance, by securely channeling data access and/or traffic in hardware between distinct zone-specific hardware ports respectively interfacing with these zones. For example, in one embodiment, the network management hardware platform may comprise a trusted (intelligent) switch or connection matrix, generally implemented in hardware and having a set of designated or reconfigurable hardware ports/relays to interface with a corresponding set of distinct port-specific and/or zone-specific processing engines, processes and/or resources. In some of the embodiments described below, each or at least some of the network zones, processes and/or resources are integrally defined within a common hardware appliance or platform, though other embodiments may rather encompass all or some externally addressable zones, processes and/or resources while maintaining internal hardware port specificity and integrity. In operation, the port-specific interconnection of the various internal and/or external resources with the centralized trusted switch, can define, in combination, a multi-level network architecture having secured data traffic or access management capabilities between such zones.

For example, in one such embodiment, a multi-zone architecture may comprise three distinct network zones having incremental data security ratings (e.g. unclassified, confidential, secret, etc.). Each zone will interface with a trusted set of zone-specific resources, each interconnected in hardware to securely execute intra and inter-zone security and/or management processes via dedicated hardware interconnections that are specific to these zones, i.e. data traffic between zones is exclusively channeled through these hardware-integrated data communication paths. Likewise, security protocols to be applied between zones are integrally implemented by security resources integral or integrally coupled (e.g. hardwired) to these paths via designated circuitry, relays, integrated and/or inline processing resources, or the like.

To illustrate one exemplary implementation, an event that occurs in a first security zone (e.g. zone A) may trigger a data transaction with a higher level, e.g. zone B. To execute this transaction, zone A must first interface with the trusted switch via a first designated hardware port thereof and zone-specific security resources applied thereto. As illustrated in some of the examples below, such zone-specific security resources may include one or more integrated processing engines and/or related hardware resources which, in some respects, may define it's own network security zone (e.g. zone X) having it's own zone-specific hardware ports (e.g. a network security enforcement and/or auditing zone or resources specifically defined in hardware to supervise transactions between zones A and B). Upon successful carriage of the zone-specific security protocol on the transaction data received via the zone A port, the data transaction may successfully carry through to zone B via distinct zone-specific hardware ports. Accordingly, zone X may act as a secure auditing or security enforcement resource between zones A and B, whereby data transactions to be implemented between these zones are necessarily transacted via zone X and the corresponding zone-specific hardware ports associated therewith of the secure switch. In doing so, while either or both network zones A and B may be external to the traffic security management device, by exclusively channeling transactions between these zones through a centralized hardware switch and having hardware port-specific security management resources integrated therewith, network and traffic security breaches can be minimized.

Following from the above example, the intelligent switch and port-specific channel resources and/or zones may be extended to further network zone levels, for example, where a resulting transaction event in zone B invokes or forwards a transaction with a further zone C, for instance, which may involve distinct security measures that can be carried out by inline channel resources and/or a specifically addressable network security enforcement or auditing zone Y. As will be appreciated by the skilled artisan, in some embodiments, some of the inter-zone security auditing and/or enforcement resources may be distinctly defined to interface exclusively with their dedicated zone(s), and/or be shared between auditing/enforcement levels through corresponding hardware links and/or relays depending on the level of security required.

In some embodiments, inter-zone security enforcement resources may channel inbound data through a data diode (i.e. one-way data flow) hardwired to the inbound level-specific hardware port. One or more security measures can then be applied to the inbound data for validation, such as authentication, filtering, logging, tapping, setting, etc., which is only released to the next level via a distinct level-specific hardware port upon successfully satisfying the applied security measures.

In one embodiment, the inter-zone security enforcement resources may outright block the data transaction until security measures have been successfully applied. For example, an inbound transaction may be processed by the enforcement resources and, if successful (e.g. validated, authenticated, etc.), safely relayed (e.g. encrypted) to the next level to be processed thereby.

In other embodiments, the data transaction may rather proceed to the next level in an encrypted fashion, for example, whereby applied security measures are used to validate the transaction and then, and only then, release a decryption key or like measure to enable the next level to process the relayed transaction.

In the following examples, systems and methods are described, in accordance with different embodiments, in which a multi-level network architecture, or at least a part thereof, can be collapsed into a single integrated appliance thereby significantly reducing a physical footprint of a given architecture while also mitigating certain security risks and management challenges common to such network architectures, and that, without invoking, at least in part, common network virtualization solutions that inherently introduce their own security risks and disadvantages, as will be readily appreciated by the skilled artisan. As will be detailed further below, while some examples illustrated herein contemplate the provision of a wholly integrated multi-level solution, such as in the provision of a fully integrated solution that can internally invoke and execute processes implemented in distinct security zones, other solutions as contemplated herein may also, or alternatively encompass a set of interconnected appliances, for example, where each appliance may nonetheless take advantage of available internal processing engine multiplicity, cryptographic resources and/or associated hardware data path customizability, to implement tiered or scaled inter or intra-level processes in the ultimate deployment of a larger scale network infrastructure. Accordingly, appliances or systems as described herein to enable the deployment of an internal multi-level architecture, should be understood to provide for the deployment of multiple distinct hardware segregated processing resources, interconnected by a deployable hardware interconnection matrix, to deliver, alone or in combination, different layered, sequential, parallel and/or nested network security services, resources and processes. Accordingly, each appliance may, in and of itself, deploy resources in distinct hardware-segregated network security zones or domains, as can they be combined to securely transact, alone or in combination, within and between such network security zones and/or domains.

In general, each integrated appliance will comprise a trusted intelligent switch or interconnection matrix as its hub that can effectively channel network resources and transactions between various network components to provide a desired outcome, all, in some embodiments, within the confines of a secured integrated hardware design and enclosure. Namely, in some embodiments, the operational components of the multi-level networking appliance can be characterized by a single circuit board design, or by an interconnected board design, operatively mounted within a singular tamper resistant shell, for example, that provides a limited number of external physical input/output interfaces, i.e. to limit potential exposure to intra-network interface tampering, reconfiguration and/or hacking. Accordingly, network component interconnections and data channel processing is relegated to the trusted intelligent switch, which, in some embodiments, can be deployed as an embedded chip interfacing with the various appliance components via defined chip hardware ports. Additional channel resources, such as data security resources, channel routing, auditing, encryption, processing and/or validation resources, or the like, may also be included in some embodiments, as will be further detailed below.

With reference to FIG. 1, and in accordance with one embodiment, an integrated multi-level network appliance 100 will now be described. The appliance generally comprises a trusted (intelligent) switch 101, generally implemented in hardware and having a set of designated or reconfigurable hardware ports/relays 102 to interface with a corresponding set of integrated processing engines 140, which can be configured or dynamically reconfigured to implement various network system functions that, in combination, define a multi-level network architecture. Examples of integrated engines 140 may include, but are not limited to, web servers, applications servers, database servers, firewalls, email servers, specialized traffic filters, application compilers, network access portals, protocol adapters, channel filtering and/or auditing engines, appliance administration engines, or the like, implemented alone or in various combinations, to produce a desired outcome. Each processing engine 140 may rely on its own isolated processor (i.e. processing core(s)) and/or memory storage device(s), or again rely on central or shared processing resources. For instance, the appliance 100 may further comprise a central storage media 142 that may be accessed via the trusted switch 101 and optionally include one or more application or engine-specific storage resources, partitions and/or zones.

As noted above, integrated processing engines 140 may also, or alternatively, encompass different intra or inter-zone auditing and/or security enforcement engines, for instance, invoked to ensure intra or inter-zone traffic and/or transactions adhere to internally defined and enforced security protocols. As will be described in further detail below, while such inter-zone auditing or management resources may encompass distinct integrated processing resources, such as that schematically illustrated by integrated processing engines 140, these may also, or alternatively encompass or invoke centralized security processing resources, such as a multilevel hardware security module (HSM) and related resources, for example.

As described herein, the intelligent switch can define a trusted communication matrix 114 that securely relays signals between the appliance's various components and network architecture levels in a trusted hardware implementation via its corresponding set of hardware ports/relays 102 and embedded switch logic. In some embodiments, the switch 101 thus effectively implements a trusted (intelligent) cross-bar or like switch that dictates multiport interconnections via distinctly defined communication channels, thus in some embodiments, defining a port interconnection or trusted communication matrix.

In some embodiments, the matrix 114 may further invoke certain embedded channel resources 116 so to further enhance interconnection logic between ports and port-related processes, and thus allow for embedded security logic integration within the switch's integrated hardware architecture. These channel resources 116 may be integrated and invoked in a one-to-one fashion, for instance, with integrated port specificity in fully maximizing secure process isolation, or again provided as a shared resource that may be invoked and implemented for different port-specific processes albeit without exposing any such processes to undue external tampering risks.

In the illustrated embodiments described in greater detail below, different channel resources may include, but are not limited to, data security resources (e.g. encryption/decryption, secured storage, or the like, later described within the context of an embedded hardware security module (HSM)), a data channel diode (i.e. to restrict data flows on a defined channel to a designated direction), a data channel filter (i.e. to filter channel data, for example, to limit throughput data to a particular subset of retrieved data, or again to systematically reconfigure or replace designated data elements on a given channel data path), a channel comparator (i.e. to invoke channel logic between channels based on a comparison of data being channeled thereon, for example, allowing process throughput only upon matching channel data), an inline encryption function (i.e. to execute inline IPSEC or TLS protocol, for example, and/or to implement an inline VPN or like communication tunnel), or a sniffer function (i.e. silent non-bypassable logging), etc.

The variable and/or customizable nature of the interconnection matrix, in some embodiments, may also or alternatively allow for the deployment and execution of different trusted hardware network interconnection solutions, such as for example, in linearly channeling port-specific data transactions between hardware ports in one or more one-to-one hardware port interconnection configurations (e.g. to provide (cryptographically) secure/trusted hardware-segregated port-specific processing paths), in consolidation/merging/multiplexing distinct data channels inbound via distinct hardware ports in a many-to-one configuration (e.g. to provide (cryptographically) secure/trusted data/transaction convergence processing paths), and/or in distributing and/or demultiplexing a single network source across multiple port-specific resources, services and/or data communication paths in parallel in a one-to-many configuration (e.g. to provide (cryptographically) secure/trusted data/transaction distribution/dissemination across multiple data channels from a trusted/reliable source).

It will be appreciated that some or all, or again different channel resources may be integrated to provide different interconnection logic and functions between port-specific processes and thus enhance available internal process complexity and flexibility in providing a whole integrated solution, in some embodiments, embedded within a singular intelligent switch chip implementation.

Internal or external system sensors 126 may also be deployed, much as will be described in further detail with reference to integrated sensor monitors 326 of FIG. 3A, so to effectively monitor for, and detect, any one or more of external/internal shell tampering; unusual/unexpected system displacements, movements, or vibrations; environmental disturbances such as water, fire, heat or smoke; uncharacteristically high system usages and/or unusual usage patterns; etc. Data acquired via external system sensors 126 may also partake in selected internal processes, for example in furnishing a random seed value for internal cryptographic or random number generation processes, for example. The system 100 may further include and benefit from a resident high precision timing device 144, for instance, in supporting processes where high precision timing may be valuable or critical.

Using the above-noted approach, systems that would otherwise require a stack of interconnected devices using a set of networking cables and software-defined network port allocations (and generally at best satisfying commercial software or hybrid security standards such as FIPS 140-2), can now be implemented within a single integrated hardware architecture, that is within a single tamper-resistant or tamper-proof shell and optionally, within a single integrated circuit board architecture, reaching if not exceeding in some embodiments described for example further below with reference to FIGS. 4 to 12, NSA's (U.S. National Security Agency) Commercial Solution for Classified (CSfC) and CSE's (Canadian Communication Security Establishment) Medium Assurance security standards.

As noted above, in some embodiments, the integrated (intelligent) switch 101 embeds a multi-zone or level hardware security module (HSM), i.e. a hardware and in some cases a single-chip HSM and intelligent switch implementation, operable to concurrently service one or more of the appliance's applications and/or functions, which would otherwise require access to an external HSM, thereby reducing overall system security and increasing tampering risks. Again, the multi-level HSM may equally apply to the provision of cryptographic services to hardware segregated resources in a same or distinct network security zone depending on the integral or distributive nature of the contemplated system at hand.

In some embodiments, the HSM invokes one or more of the switch's hardware ports, which can be configured or reconfigurable to receive input cryptographic data (e.g. public data, public key, etc.) thereon to execute a designated cryptographic process within the HSM in servicing a particular computational process, application or function, i.e. a particular engine 140 or transit between engines 140. In general, received input data will be port-specific in that only input cryptographic data specific to the port on which it is received can be successfully processed. To do so, each hardware port will generally have defined in association therewith a corresponding hardware link or channel (e.g. static and/or reconfigurable hardware link, channel and/or switch) to a segregated hardware storage space or medium that stores secured port-specific cryptographic data thereon exclusively retrievable for processing as a function of received input data specific to that hardware port. For example, distinct embedded storage spaces or resources may be provided with respective hardware data links to their corresponding port, as can distinct storage partitions and/or zones be defined within a same embedded memory storage resource and accessed via dedicated hardware logic or the like. Namely, distinct embedded storage spaces or resources may encompass a physically segregated, separated and/or defined hardware storage space on one or more hardware storage devices (i.e. memory board, chip, component, etc.) that is physically paired, allocated and/or associated with a given port-specific cryptographic and/or application process. For example, each storage space may be designated or adapted to store one or more cryptographic keys and/or like cryptographic data usable in invoking and/or executing a given port-specific process, as can other application/process-specific data be securely stored to implement functions for a particular level of the multi-level appliance. Accordingly, in some embodiments, a dedicated memory space may define a secure key space for a given cryptographic process and/or encompass storage capacity for other types of cryptographic and/or other related data. An integrated cryptographic or related engine, executed by an embedded or hardware-linked processor, can then be invoked to internally process the retrieved secured cryptographic data, for instance in conjunction with the input data, to produce an intended computation result.

Accordingly, the entire process can be relegated to the hardware space without invoking a software or application layer and thus, without opening the HSM to tampering opportunities that may otherwise present themselves in conventional HSMs, such as traditional network-attached HSMs. Conversely, the HSM embodiments described herein allow for a full, and in some embodiments a single-chip (i.e. static or reconfigurable (e.g. FPGA)) hardware solution that can be used to concurrently service multiple applications and/or processes from within a same tamper-resistant environment by virtue of the intelligent switch integration. Accordingly, the solutions provided herein may allow for a significant increase in security protocol ratings while also significantly reducing, in some embodiments, a hardware footprint required to implement complex network security architectures that, in most cases, would require the co-location of multiple distinctly executed HSMs internet-worked with various external devices in a complex cabled architecture.

Furthermore, in some embodiments, the HSM may allow for software, firmware and/or FPGA updates through a secured validation process. This validation process may, in some embodiments, only accept validated inputs by means of one or more corresponding hardware port through a "chain of trust" process via digital signatures using quantum safe algorithms, such as hash-based signature algorithms.

In accordance with different illustrative embodiments, different non-limiting examples of single-chip hardware solutions may be considered. In some embodiments, a Xilinx's System on Chip (SoC) or Multi-Processor SoC (MPSoC) product may be used, such as Zynq® and Zynq® UltraScale+™ respectively. The Zynq® product line is known to contain 2 ARM processors, memory components and Field Programmable Gate Array (FPGA) while the Zynq® UltraScale+™ has 6 ARM processors, memory components and FPGA. In a first exemplary embodiment, the Zynq® device may be used wherein one of the two ARM processors implements an integrated processing engine 140, a second ARM processor handles all memory accesses and the FPGA implements the trusted communication matrix 114 between external communication ports and internal memory and processing engine capability. In a second exemplary embodiment, the Zynq® UltraScale+™ is used wherein 5 of the 6 ARM processors are used as independent processing engines while the sixth processor is used for handling all memory accesses and the FPGA implements the trusted communication matrix 114 between the external communication ports, internal memory and integrated engine capability. In a third exemplary embodiment, the Zynq® UltraScale+™ is used where all of the 6 ARM processors are utilized as independent integrated processing engines managing their own memory space and the FPGA implements the trusted communication matrix 114 between the external communication ports, internal memory and cryptographic engine capability. Other known and future technologies, hardware configurations and products may also be considered, as will be readily apparent to the skilled artisan, without departing from the general scope and nature of the present disclosure. Further illustrative details, examples, advantages and features will be described below with reference to exemplary embodiments.

Figure 2:
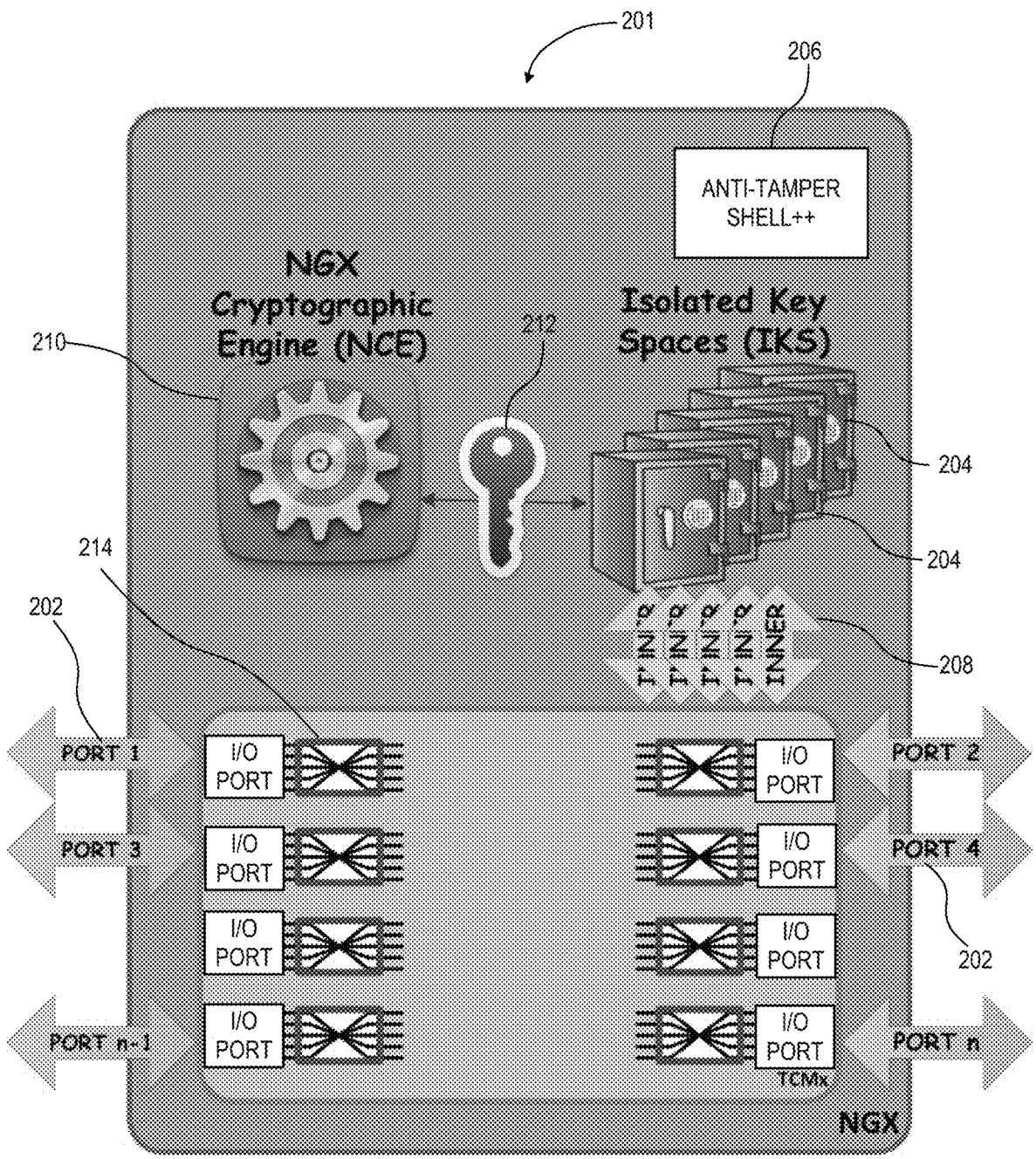
FIG. 2 is a schematic diagram of an embedded hardware security module (HSM) operable as a trusted intelligent switch in the integrated multi-level network appliance of FIG. 1, in which embedded HSM security resources are provided as an optional embedded channel resource, in accordance with one embodiment.

With reference to FIG. 2, and in accordance with one exemplary embodiment that follows from the above description, a hardware security module (HSM) supported intelligent switch, generally referred to using the numeral 201, will now be described. In the illustrated embodiment, the HSM-supported switch 201 generally comprises a plurality of hardware ports 202, at least some of which being operatively linked through hardware, e.g. direct hardware link or switch channel logic 208, to a corresponding port-specific hardware storage resource and key space 204 (e.g. distinct embedded memory storage device, hardware memory storage partition and/or zone). Each port-specific hardware storage resource and key space 204 can be configured to store secured port-specific cryptographic data (e.g. private encryption/decryption key 212) that is only retrievable upon input of corresponding input cryptographic data from a corresponding port. In other words, secured data may be further secured by virtue of hardware port specificity, whereby input data received on an incorrect hardware port will fail to access corresponding secured data linked to this incorrect port, and also fail to access secured data linked with any other port. Upon successful input of external data via an appropriate hardware port 202, corresponding secured data (e.g. key 212) can be internally retrieved and processed by an integrated engine (i.e. cryptographic engine 210) to deliver a desired outcome.

To further enhance anti-tampering measures, in some embodiments, the HSM-supported switch 201 may be enclosed (e.g. along with other appliance components) within a tamper-resistant box, container or shell 206.

As noted above, the provision of hardware-linked HSM ports and segregated storage resources enhances overall system integrity and resilience to external tampering, while also providing the added benefit of HSM multiplicity within a common multi-level network appliance and tamper-proof or resistant shell. In fact, certain embodiments may efficiently multiply HSM resource allocations within a single chip implementation, e.g. with embedded memory(ies), processor(s) and hardware logic, while leveraging both the added security of distinctly segregated hardware-linked storage resource interfaces and the option to share internal hardware resources, such as a common integrated cryptographic engine 210 that may be invoked to concurrently or at least sequentially process secured data from multiple isolated port-specific hardware storage resources and key spaces 204. As will be described in further detail below, this integrated hardware implementation may further benefit the deployment of integrated secure system architectures, such as multi-level security system architectures and the like, all within the confines of a single hardware casing or shell, if not integrated onto a singular circuit board in some embodiments.

As noted above, the embedded HSM-supported switch 201 combines the benefits of an integrated HSM with that of the intelligent switch configuration. Accordingly, in some embodiments, at least some of the hardware ports 202 can be linked through hardware to interface with distinct storage resources 204 and/or ports 202, processes/data associated therewith, and/or link distinct appliance processing engines as described above, thereby defining a trusted communication matrix 214 that can be leveraged in more complex system implementations to benefit from the secured co-location of distinct resources on a same hardware implementation (e.g. same hardware chip) without exposing the device to external or software-related tampering risks. In other words, port-specificity can be maintained to govern access to secured data in executing selected cryptographic processes, and further enhanced by leveraging predefined hardware interconnections (i.e. data channels) between port-specific resources and/or data allocations.

The trusted communication matrix 214 can be implemented as a set of static hardware relays and/or logic, and/or dynamically implemented via reconfigurable hardware logic and/or relays. Accordingly, certain port-specific HSM processes invoked by input data received via a particular port interface may be configured to depend from upstream cryptographic and/or network system processes executed in respect of cryptographic data received on another hardware port and used to retrieve distinctly stored and maintained private data. Naturally, certain cryptographic processes may equally feed downstream processes executed in respect of a distinct port-specific data resource. Given the hardware implementation of the matrix 214, system security logic and complex data channeling can be hardwired into the HSM-supported switch 201 and thus minimize external exposure to tampering. Given the above, it will be appreciated that while some ports 202 may be associated with corresponding storage resources 204 in a one-to-one fashion, other port interconnection scenarios may be invoked to logically associate a same port with distinct storage resources, as can distinct storage resources may be logically associated with a same hardware port. Likewise, additional hardware port interfaces may be defined to execute certain channel interconnection configurations without necessarily forming a direct link with any particular storage resource 204, for example linking through to other appliance processing engines and/or resources.

Furthermore, in some embodiments, the HSM may allow for software, firmware and/or FPGA updates through a secured validation process. This validation process may, in some embodiments, only accept validated inputs by means of one or more corresponding hardware port through a "chain of trust" process via digital signatures using quantum safe algorithms, such as hash-based signature algorithms.

In accordance with one exemplary embodiment and similar to the single-chip hardware embodiments discussed in FIG. 1, the presently described embodiments may be implemented using a Xilinx's SoC or MPSoC such as the Zynq® product line wherein one of the two ARM processors implement the cryptographic engine 210, a second ARM processor handles all memory accesses and the FPGA implements the trusted communication matrix 214 between ports 202 and internal memory and cryptographic engine 210. Other known and future technologies, hardware configurations and products may also be considered, as will be readily apparent to the skilled artisan, without departing from the general scope and nature of the present disclosure.

Figure 3A:
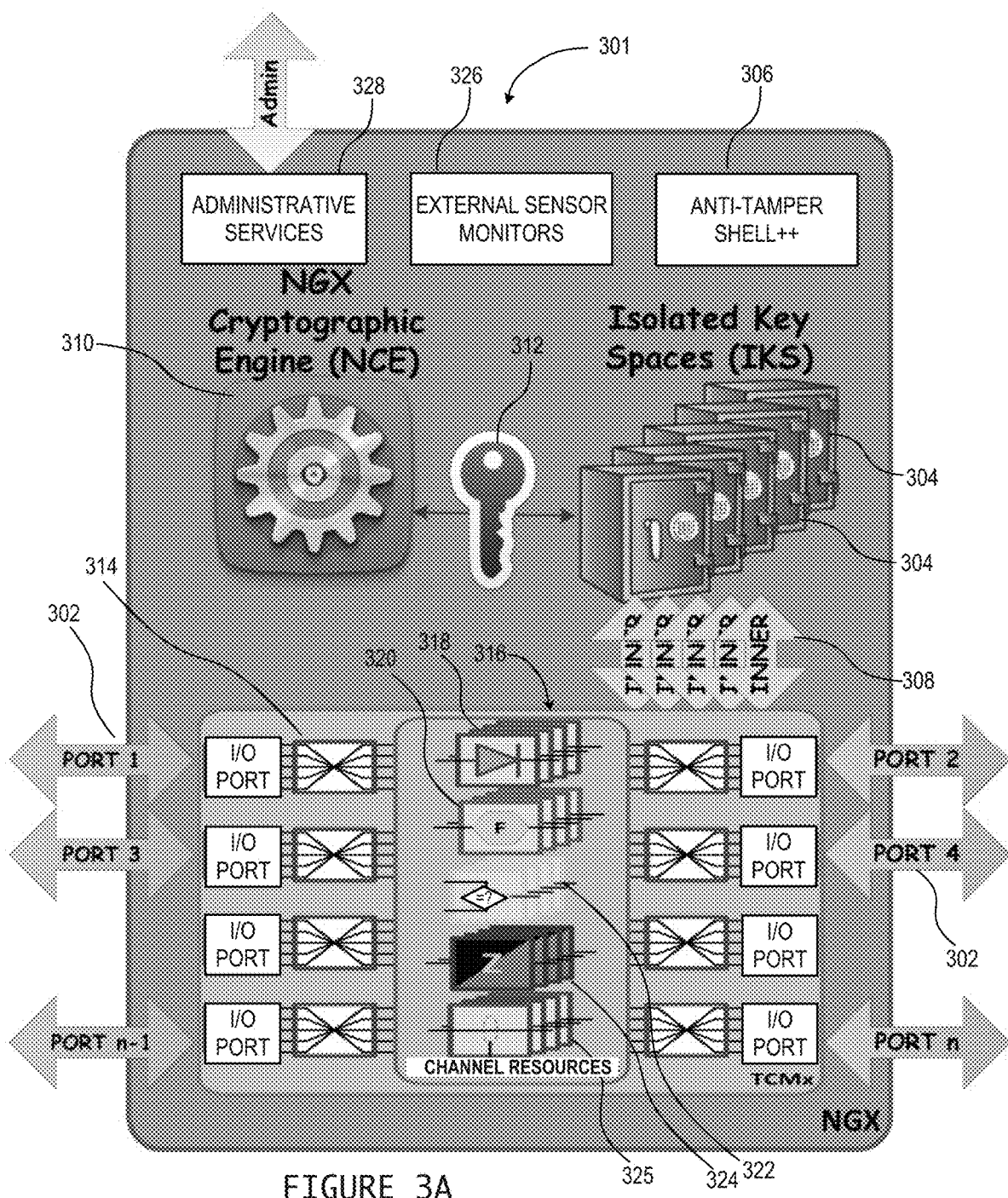
FIG. 3A is a schematic diagram of an embedded hardware security module (HSM) operable as a trusted intelligent switch in the integrated multi-level network appliance of FIG. 1, in which embedded HSM security resources are provided as an optional embedded channel resource, and in which additional channel resources are also optionally provided, in accordance with another embodiment.

With reference to FIG. 3A, and in accordance with yet another embodiment, an HSM-supported switch 301, much as described above with reference to FIG. 2, will now be described. In this embodiment, the HSM-supported switch 301 again generally comprises a plurality of hardware ports 302 each operatively linked through a direct hardware link or switch channel logic 308 to a corresponding port-specific hardware storage resource and key space 304, in which secured port-specific cryptographic data 312 can be stored and securely retrieved to execute one or more cryptographic processes via an integrated engine 310.

As with the embodiment of FIG. 2, at least some of the hardware ports 302 can be linked through a direct hardware link or switch channel logic 308 to interface with distinct storage resources 304 and/or ports 302, processes/data associated therewith, and/or accessible appliance processing engines and/or resources, thereby again defining a trusted communication matrix 314. The matrix 314 can again be implemented as a set of static hardware relays and/or logic, and/or dynamically implemented via reconfigurable hardware logic and/or relays.

In this embodiment, however, the matrix 314 may further invoke certain embedded channel resources 316 so to further enhance interconnection logic between ports and port-related processes, and thus allow for embedded security logic integration within the HSM's integrated hardware architecture. These channel resources 316 may be integrated and invoked in a one-to-one fashion, for instance, with integrated port specificity in fully maximizing secure process isolation, or again provided as a shared resource that may be invoked and implemented for different port-specific processes albeit without exposing any such processes to undue external tampering risks.

In the illustrated embodiment, different channel resources are schematically illustrated to include any one or more of a data channel diode 318 (i.e. to restrict data flows on a defined channel to a designated direction), data channel filter 320 (i.e. to filter channel data, for example, to limit throughput data to a particular subset of retrieved data, or again to systematically reconfigure or replace designated data elements on a given channel data path), a channel comparator 322 (i.e. to invoke channel logic between channels based on a comparison of data being channeled thereon, for example, allowing process throughput only upon matching channel data), an inline encryption function 324 (e.g. to execute inline IPSEC or TLS protocol, for example, and/or to implement an inline VPN or like communication tunnel), or sniffer function (325).

For example, in some embodiments, an inline encryption function may be invoked to facilitate certain encrypted exchange with an end or internal client, process or application, that do not necessarily require access to the cryptographic engine and related higher security protocols. For instance, while critical private key management processes (e.g. control plane processes such as user/client authentication/authorization, authenticated session initiation and configuration, private key generation and management, system management functions, etc.) may be strictly relegated to the cryptographic engine and defined secure key spaces, less critical processes (e.g. communication plane processes, such as authenticated data access transactions, updates, edits, etc.,) for instance executed on the basis of a symmetric and/or ephemeral (e.g. session) key used to expedite processing and communications, may be implemented via the inline channel encryption resource 324. In so doing, the HSM-supported switch 301 may integrally combine enhanced control plane cryptographic services, as described above, with inline cryptographic services, all within a same hardware design and configuration. This may, for example, readily allow for a singular hardware design, as described herein, to replace an otherwise common network (e.g. banking) architecture in which control plane functions and processes are traditionally relegated to a distinct network interfacing HSM, while session-based cryptographic functions are subsequently channeled through downstream network servers. The integrated configuration discussed herein may further, or alternatively, allow for the integrated execution of a virtual private network (VPN) or even nested VPNs to achieve a layered architecture within a single hardware design rather than to invoke a distributed network architecture in which security protocols are otherwise run on a higher network (e.g. TCP/IP) layer, and thus, more vulnerable to physical or external tampering.

As noted above, a sniffer or like function may also, or alternatively be deployed as an integrated and/or customizable channel resource, for instance, to provide a silent non-bypassable logging or network/channel tapping function to gain visibility on network channel communications. For instance, such channel resources may be non-obstructively used to monitor channel communications and raise a flag or alert upon identifying suspicious or anomalous channel activity, if not shutting down outright communications on this channel until remedial action can be taken.

In this particular embodiment, the HSM-supported switch 301 is further provided with optional external sensor monitors 326, for example, which may take the form of various sensors and/or monitors used to detect and report on system breaches or tampering. For example, sensors may include, but are not limited to, integrated sound sensors that may detect shell impacts or breaks; inclinometers or 3D accelerometers to detect displacement or physical reorientation of the shell; smoke, heat and/or water sensors to detect environmental issues and/or tampering (e.g. multiple temperature sensors can be used to detect tampering via differential internal temperature metering); proximity or motion sensors to detect presence of unauthorized personnel; location or geofencing sensors to detect unauthorized transport of the HSM-supported switch, and overall appliance in general, beyond a designed security zone; and other such sensors as may be appreciated by the skilled artisan. As noted above, data outputs from these sensors may also partake in certain trusted internal processes, for example, as random seed values for downstream cryptographic or random value generation processes.

The HSM-supported switch 301 may further include an administrator port 328, such as a local (e.g. external appliance-based) USB port or dedicated network port interface to allow for secured administrative access to the switch 301 and allow for system maintenance and reconfiguration as may be required or desired from time to time. For example, where the switch 301 is implemented as a reconfigurable chip (e.g. FPGA), certain hardware resources and/or logic may be re-allocated or reconfigured to address system or security protocol changes or improvements. For example, the trusted communication matrix 314 may be adjusted to reflect new port allocations or leverage new or existing channel resources to further enhance security protocols, introduce new security levels or system integrations, or again refine existing protocols with improved processes and functions.

Again, in some embodiments, the HSM-supported switch 301 may allow for software, firmware and/or FPGA updates through a secured validation process. This validation process may, in some embodiments, only accept validated inputs by means of one or more corresponding hardware port (i.e. administrator port 328) through a "chain of trust" process via digital signatures using quantum safe algorithms, such as hash-based signature algorithms.

As illustratively described above with reference to FIGS. 2 and 3A, in some embodiments, the HSM-supported switch (201, 301) may be configured to share a common cryptographic engine (210, 310), that is an embedded resource executing one or more cryptographic processes predefined in firmware and secured within the confines of the HSM's hardware architecture. Accordingly, respective secured cryptographic data (e.g. private key data or key space) can be respectively accessed and used by the common cryptographic engine from respective port-specific storage spaces (204, 304) to render secure HSM functions to respective port-specific masters (e.g. users, clients, processes, applications, etc.)

In such embodiments, similarly to some embodiments discussed with respect to FIGS. 1 and 2, a single-chip implementation may use a Zynq® device described above wherein one of the two ARM processors implements the common cryptographic engine 310, a second ARM processor handles all memory accesses and the FPGA implements the trusted communication matrix 314 between external communication ports 302 and internal memory and cryptographic engine 310.

Figure 3B:
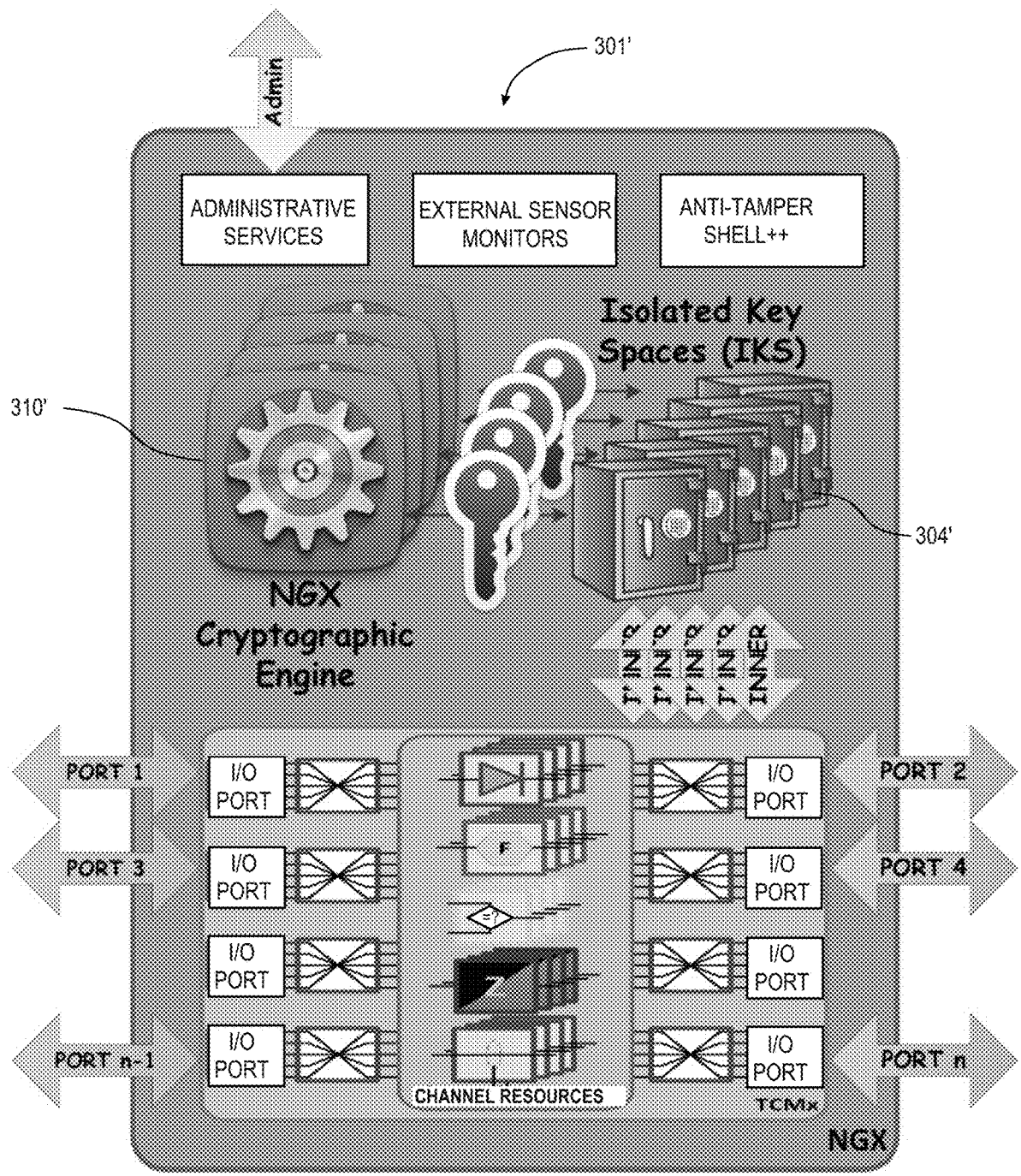
FIG. 3B is a schematic diagram of an embedded hardware security module (HSM) operable as a trusted intelligent switch, in accordance with yet another embodiment.

With reference to FIG. 3B, an alternative HSM-supported switch configuration 301' is rather designed to define a respective cryptographic engine 310' for each of the secured port-specific hardware storage resource and keys paces 304'. By replicating cryptographic resources, further hardware isolation (e.g. distinct firmware resources and/or firmware executed on distinct embedded processor cores) can be achieved in thus further enhancing the HSM function's tamper resistance. In this exemplary embodiment, a possible single-chip hardware implementation may consist of using the Zynq® UltraScale+™ chip wherein 5 of the 6 ARM processors are used as independent cryptographic engines 310' while the sixth processor is used for handling all memory accesses and the FPGA implements the trusted communication matrix 314 between the communication ports 302, internal memory and cryptographic engines 310'.

Figure 3C:
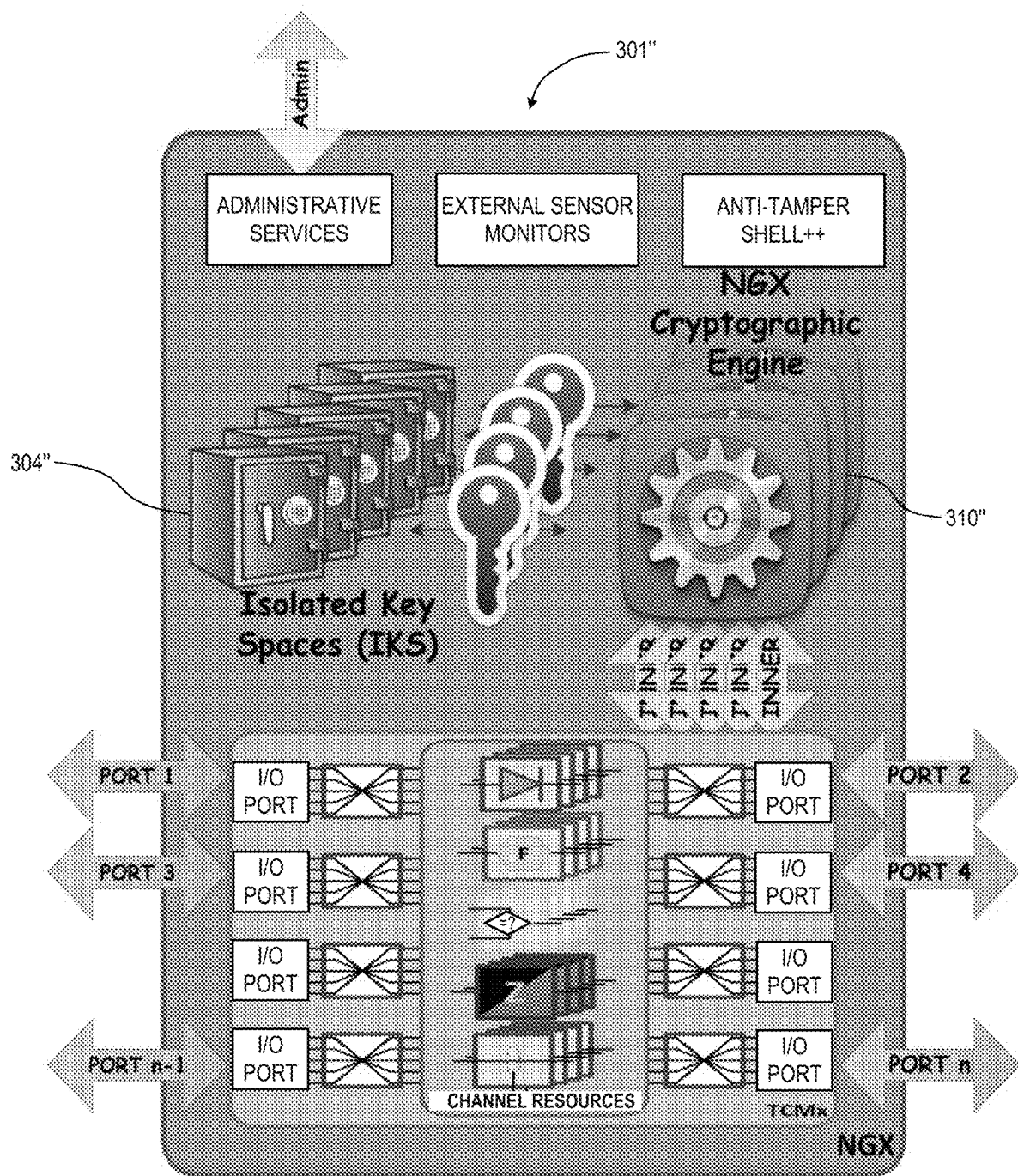
FIG. 3C is a schematic diagram of an embedded hardware security module (HSM) operable as a trusted intelligent switch, in accordance with yet another embodiment.

In yet another embodiment illustrated in FIG. 3C, an alternative HSM-supported switch configuration 301" again replicates cryptographic resources 310" for each of the defined port specific hardware storage resources and key spaces 304", but in this case, embeds these resources within the hardware design so to be invoked before access is granted to the respective port-specific key spaces. This may be particularly useful in a context where, for example, storage resources used to define the respective key spaces are provided external to an otherwise embedded HSM chip. In other words, HSM resources may leverage an external storage resource such as a co-located or integrated flash drive or hard drive to store private key or other secured cryptographic data for exclusive access via embedded port-specific cryptographic engines. The person of ordinary skill in the art will appreciate that other configurations may also be considered without departing from the general scope and nature of the present disclosure. A possible exemplary implementation may consist of using, as discussed above, a Zynq® UltraScale+™ chip but wherein all of the 6 ARM processors are used as independent cryptographic engines 310" managing their own port-specific hardware storage resource and key space 304" and the FPGA implements the trusted communication matrix 314 between the communication ports 302, internal memory and cryptographic engine 310. Other known and future technologies, hardware configurations and products may also be considered, as will be readily apparent to the skilled artisan, without departing from the general scope and nature of the present disclosure.

As noted above, using different aspects of the above-described embodiments, complex system architectures may be deployed on a single chip, or again on a same integrated board design, i.e. where an embedded multi-port HSM-supported switch can be integrated with other system hardware on a same or interconnected circuit boards to deliver a complex (e.g. multi-purpose, multi-level, multi-tiered, multi-user, multi-zone, etc.) network service and system as a whole, all in some embodiments, within a same tamper-resistant shell.

Figure 4:
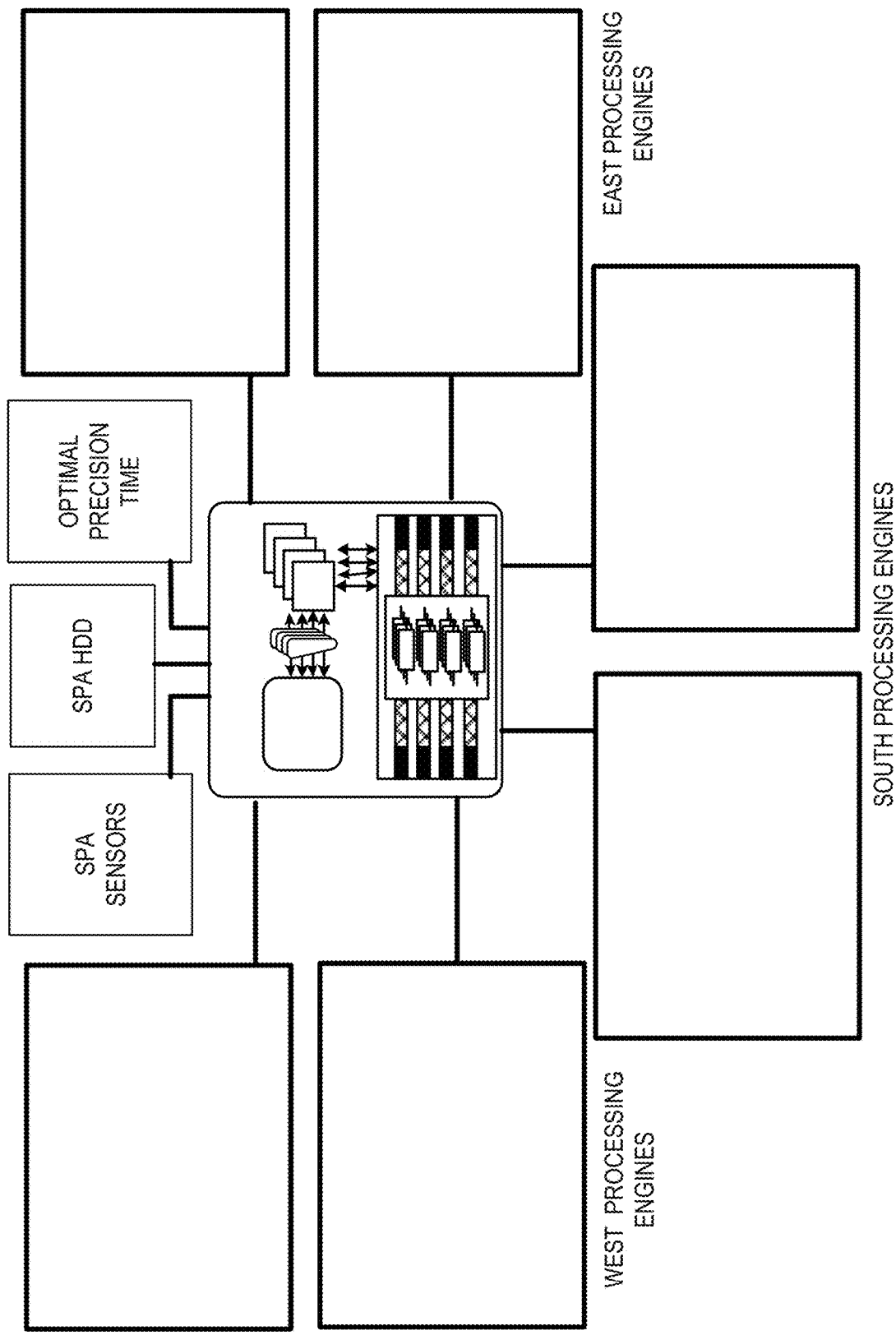
FIG. 4 is a schematic diagram of the embedded HSM of FIG. 3A once integrated within the appliance of FIG. 1 thereby acting both as an intelligent switch and as a multi-level HSM that interfaces via respective hardware connections with a series of associated appliance processing engines, in accordance with one embodiment.

With reference to FIG. 4, and in accordance with one embodiment, an integrated security processing system 400 will now be described, in which a hardware-implemented HSM-supported switch 401, much as described above with reference to FIGS. 3A to 3C, is illustratively integrated to act as a multi-function HSM within the integrated system architecture of system 400. In this particular embodiment, the HSM-supported switch 401 illustratively comprises a plurality of hardware ports 402 each operatively linked through hardware to a corresponding port-specific hardware storage resource and key space 404, in which secured port-specific cryptographic data 412 can be stored and securely retrieved to execute one or more cryptographic processes via an integrated engine 410. Again, hardware ports 402 can be linked through hardware to interface with distinct storage resources 404 and/or ports 402, and/or processes/data associated therewith, to define a trusted communication matrix 414. The trusted communication matrix 414 can again be implemented as a set of static hardware relays and logic, and/or dynamically implemented via reconfigurable hardware logic or relays. Embedded channel resources 416 are also optionally provided to further enhance interconnection logic between ports and port-related processes.

Integrated with the HSM-supported switch 401 are provided distinct processing resources 420 that may be configured to execute various system processes that rely, at least in part, on the cryptographic outputs of the HSM-supported switch 401, and/or contribute inputs to the HSM-supported switch 401 to be processed in respect of one or more downstream processes. Generally, these processing resources 420 will include one or more processing engines and storage media encoding various machine executable tasks and instructions to be processed thereby, for example, via one or more accessible processors or the like. Accordingly, a secure data path may be internally routed from one processing engine 440 to the other via the integrated HSM-supported switch 401, in some embodiments, either internally hardwired via internal cabling or direct circuit board interconnections, so to effectively execute multi-level or multi-function data security system integration within a wholly integrated system implementation.

Furthermore, given the integrated infrastructure of system 400, additional elements may be collocated or integrated with the above-described components to further enhance or extend processing resources and functionality. For example, a central storage device 442 may be included to provide additional secure/internal storage usable in the various processes invoked and implemented by the system 400.

Internal or external system sensors 426 may also be deployed, much as described above with reference to integrated sensor monitors 326 of FIG. 3, so to effectively monitor for, and detect, any one or more of external/internal shell tampering; unusual/unexpected system displacements, movements, or vibrations; environmental disbursements such as water, fire, heat or smoke; uncharacteristically high system usages and/or unusual usage patterns; etc.

The system 400 may further include and benefit from a resident high precision timing device 444, for instance, in supporting processes where high precision timing may be useful if not critical.

Using the above-noted approach, systems that would otherwise require a stack of interconnected devices using a set of networking cables and software-defined network port allocations (and generally at best satisfying commercial software or hybrid security standards such as FIPS 140-2), can now be implemented within a single integrated hardware architecture, that is within a single tamper-resistant shell and optionally, within a single integrated circuit board architecture, reaching security medium assurance (Communication Security Establishment—CSE Canada) security standards or CSfC (Commercial Solutions for Classified—U.S. National Security Agency) standards, and beyond.

Similarly to the previously described exemplary embodiments, the HSM-supported switch 401 may also allow for software, firmware and/or FPGA updates through a secured validation process wherein, in some embodiments, validated inputs may be accepted by means of hardware ports 402 (or other ports) only through a "chain of trust" process via digital signatures using quantum safe algorithms, such as hash-based signature algorithms.

Figure 5:
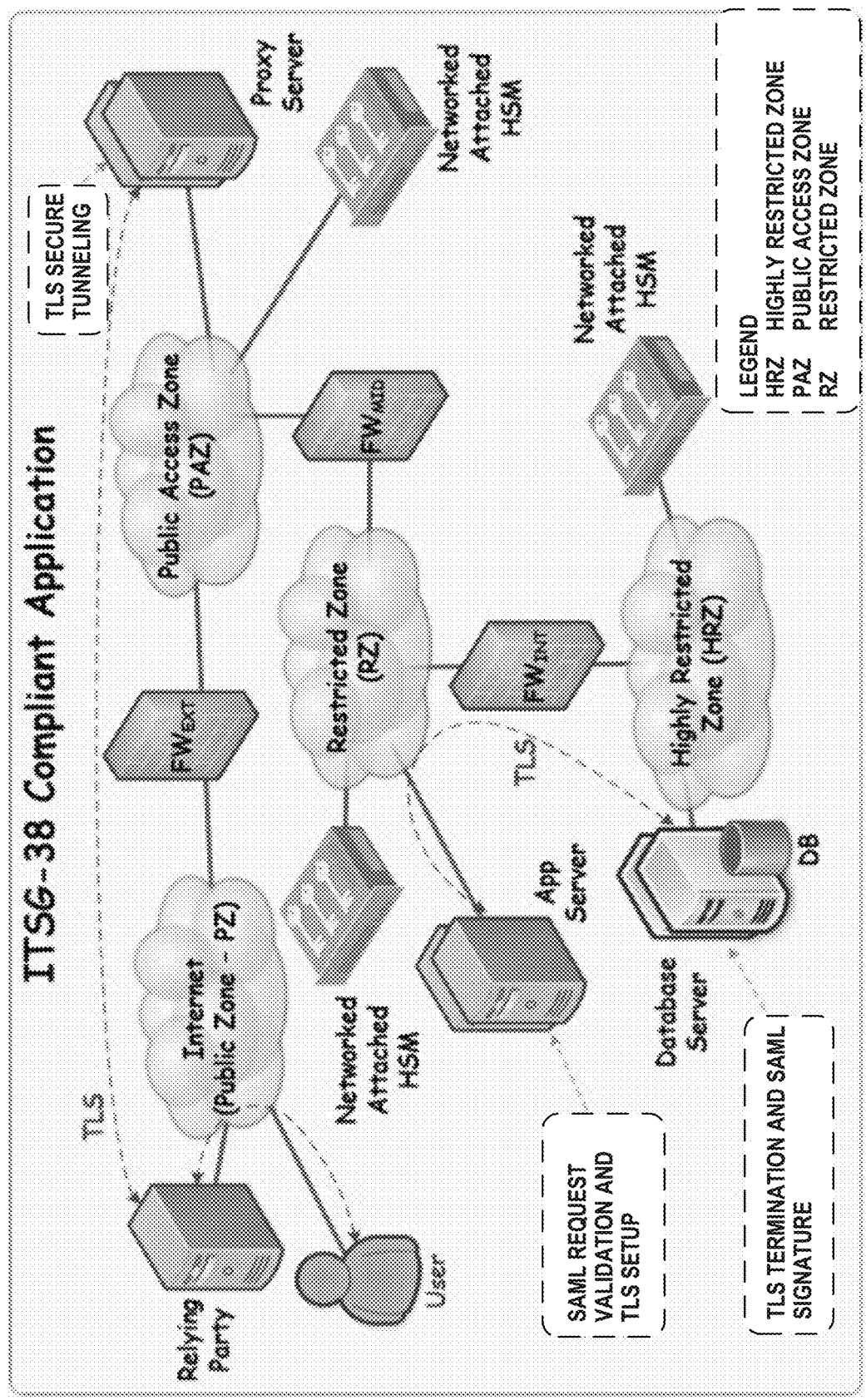
FIG. 5 is a schematic diagram of a network security zoning architecture for a secure application invoking various network security zones, in accordance with one embodiment.

With reference to FIG. 5, a network security zoning architecture is shown (i.e. for an ITSG-38 Compliant Application—see Information Technology Security Guidelines https://www.cse-cst.gc.ca/en/publication/itsg-38) in which a network path is progressively routed through various security zones. For example, a user can establish a communication link within a public zone (PZ, i.e. Internet) with a relying party, which then seeks to establish a link to a public access zone (PAZ) that is deployed behind an external firewall ($FW_{EXT}$) and serviced by a first network attached HSM and proxy server to establish Transport Layer Security (TLS) Secure Tunneling with the relying party. A connection is then extended to a restricted zone (RZ) that is itself deployed behind a middle firewall ($FW_{MID}$) and serviced by its own network attached HSM to link into an App Server to initiate a Security Assertion Markup Language (SAML) Request validation and TLS Setup with a downstream database server (DB) deployed within a highly-restricted zone (HRZ). The DB server deployed within the HRZ is once again deployed behind its own internal firewall ($FW_{INT}$) and serviced by its own network attached HSM to provide TLS termination and SAML Signature. Generally, using conventional network security zoning equipment, each firewall, HSM, the proxy server, the App server and the database server will constitute a distinct device stacked within a hardware stack and interconnected via a set of network cables, at best reaching a FIPS 140-2 security standard rating.

Figure 6:
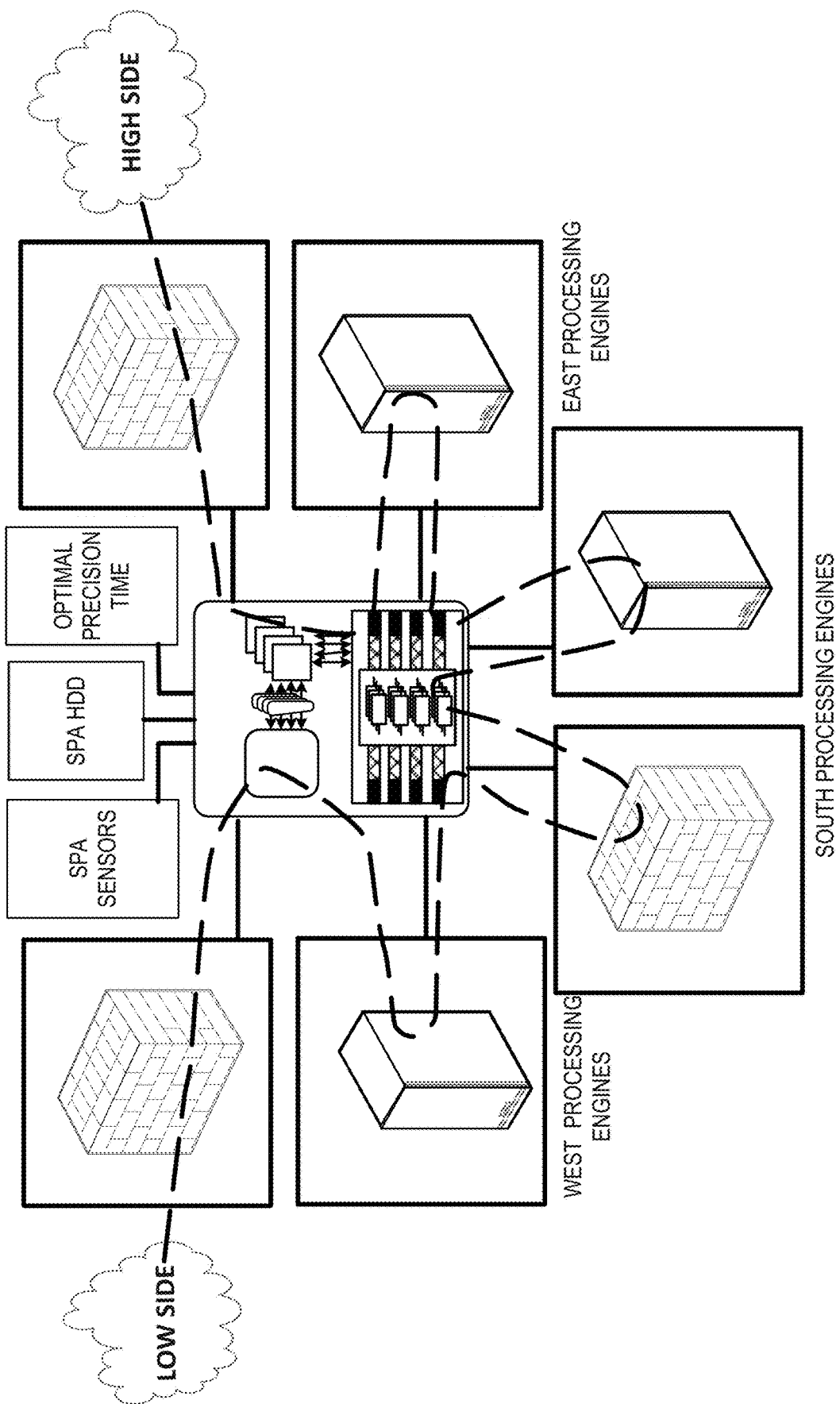
FIG. 6 is a schematic diagram of a network security zoning architecture, such as that illustrated in the embodiment of FIG. 5, deployed within the context of the integrated appliance illustrated in FIG. 4.

As illustrated in FIG. 6, in accordance with one embodiment, the network security zoning architecture described above with reference to FIG. 5 can, in some embodiments, be readily deployed using the integrated system hardware assembly generically described above with reference to FIG. 4. For instance, each integrated processing engine 440 may be configured to implement a different system firewall or server such that a low security network link 450 can be channeled into the integrated device 400 via a first external firewall 452 before invoking the integrated HSM resources of HSM-supported switch 401 via a first hardware port thereof to invoke a first level security process therewith. Once successfully authenticated, transaction data can be exchanged with a first processing engine 454 (e.g. proxy server of FIG. 5), which can feed back into the HSM-supported switch 401 via distinct hardware ports to traverse a second firewall 456 and ultimately invoke a second level security process in order to access a second processing engine 458 (e.g. App Server of FIG. 5). The HSM-supported switch 401 is again leveraged to invoke a third level security process in order to access a third process engine 460 (e.g. database server of FIG. 5). Conversely, a trusted high security link 462 can provide a more direct access to a high security zone via distinct HSM-supported hardware ports.

As demonstrated above, the integrated security processing system (appliance) 400 of FIGS. 4 and 6 can effectively improve security protocol ratings for a given system architecture while drastically reducing a required hardware rack footprint and associated host maintenance and security requirements. Namely, by integrating a significant portion if not the entire security processing system within a same tamper-resistant shell, optionally with associated temper-monitoring sensors and/or devices, and further optionally within a same circuit board architecture, significant improvements in whole system security, reliance and maintenance can be realized. For example, noted improvements, features and/or advantages may include, but are not limited to, enhanced application security, out-of-the-box managed security service provider support, multi-tenant ready, higher than FIPS assurance, true hardware-based process isolation, trusted boot applications, secured field updates, quantum resistant cryptography, physical and operation security, to name a few.

Furthermore, given the integrated architecture of the security processing system described above, and in particular, the secured integrated network security zoning architecture, a multi-tier administrative access protocol may be deployed to provide selective remote or external administrative access to distinct zone resources and/or the HSM-supported switch and its embedded resources based on respective administrative access authorization profiles. Namely, the integrated nature of the herein-described embodiments may enable such distributed access authorization profiles to be formed and leveraged via a common administrative access interface and/or port, thereby avoiding the otherwise commonly required local administrative access to distinct network resources or again the provision of distinct administrative interfaces commonly available for each network resource and device in conventional physically isolated network stacks. For instance, one particular administrative access profile may provide authenticated access to certain network-user-related resources, whereas another may rather or additionally provide authenticated access to an application server and related resources, and whereas yet another may provide restricted access to administrative functions of the HSM-supported switch, for instance, to implement system security updates (cryptographic engine update, HSM access protocol improvements, etc.), reconfigure and/or update respective data channel paths and/or resources, etc. It will be appreciated that certain authenticated administrative access profiles may allocate access privileges to one or more zones and/or system resources, while restricting other zones and/or resources to other profiles.

While the above provides one exemplary implementation of an integrated multi-level security processing appliance, various alternative integrated system applications can be designed to leverage the features, functions and advantages of the above-described embodiments. For example, this integrated appliance may also be envisioned as a part or to include a Universal Cybersecurity Platform (UCSP), wherein said platform integrates a variety of cybersecurity measures. Such a platform may comprise a single or multiple software tools/packages that allow to integrate multiple cybersecurity features such as key management, access to cryptographic algorithms, including quantum-safe cryptographic algorithms, zoning applications, patch management, secure boot, etc.

With this in mind, the integrated device itself may be configured to provide a security processing appliance or platform that delivers functionality such as, but not limited to, entropy as a service functionality, smart data diode functionality, trusted data guard functionality, protocol adapters, redundant sanitizing functions, trusted comparators, filter validation functions, dual layer VPNs, or the like. Examples of such implementations will be provided below, in a non-restrictive manner.

Figure 7:
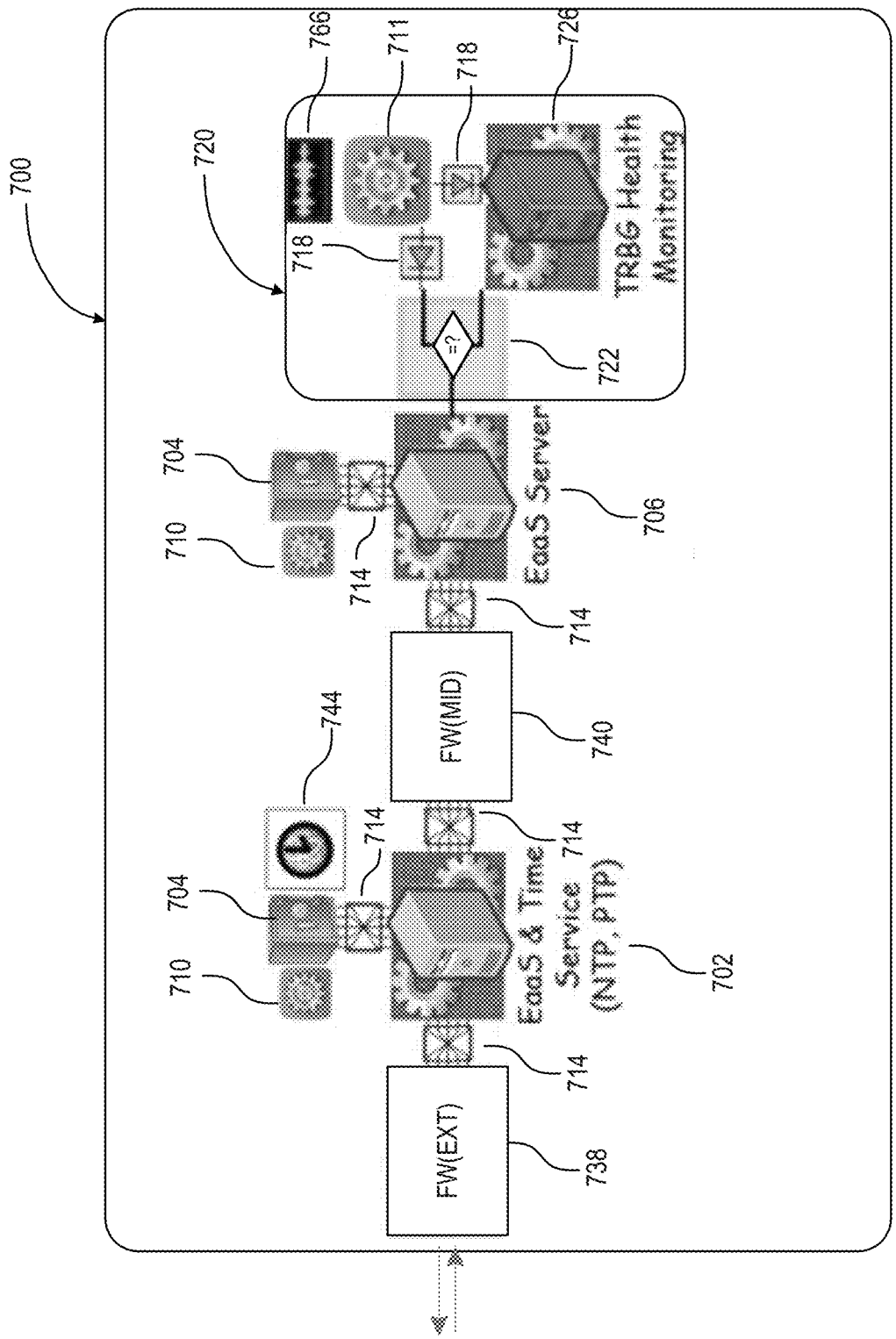
FIG. 7 is a schematic diagram of a combined Entropy as a Service (EaaS) and Time Service system, as implemented within a single security processing appliance and in accordance with one embodiment, for providing accurate time-stamps and entropy data to client systems.

With reference to FIG. 7, and in accordance with one embodiment, a combined Entropy as a Service (EaaS) and Time Service system 700 will now be described, in which a full EaaS and Time service system is implemented within a single integrated security processing appliance (SPA), platform or like device. In general, the security of cryptographic applications depends strongly on the secrecy of the cryptographic keys. These must be very difficult to guess and the strength of a given key is strongly dependent on a measure of randomness called the Shannon entropy, or just entropy in the present context. Usually, sources of true randomness can be provided by low-level, statistically random noise signals, such as thermal noise and other stochastic or quantum phenomena. The higher the entropy available to a computing system, the more random and secure the generated keys will be. Standard computer systems, especially IoT devices, have difficulty producing good randomness. Using a EaaS system, these networked systems and devices can request high-entropy random data and fresh timestamps from the EaaS & Time Service server to increase the strength of locally generated encryption keys on boot. Currently such a service would be provided over the Internet, which provides for security issues. Conversely, the illustrative embodiment of FIG. 7 provides the advantage of a fully integrated EaaS & Time service system implemented within a single SPA while also offering port-specific security features similar to those discussed in the previous embodiments.

As illustrated, system 700 comprises an integrated EaaS and time service engine 702, to which external port-specific connections are first made through integrated external firewall ($FW_{EXT}$) engine 738. The service engine 702 is further operatively linked through hardware to a corresponding port-specific hardware storage resource and key space 704 by means of a trusted communication matrix 714, in which secured port-specific cryptographic data can be stored and retrieved to execute one or more cryptographic processes via an integrated cryptographic engine 710, for example. Accordingly, the integrated service engine 702 can send back port-specific timestamps and entropy data to external systems and devices connected to the SPA 700.

In the illustrated embodiment, a high precision timestamps (e.g. fully compatible with the NTP and PTP formats) are provided by an operatively linked resident high precision timing device 744, such as an on-board atomic clock or similar. Meanwhile, entropy data is provided by an integrated port-specific EaaS server engine 706, deployed behind an integrated middle firewall ($FW_{MID}$) engine 740. The EaaS server engine is itself operatively linked to a secured (distinct) hardware storage resource 704 and integrated cryptographic engine 710 by means of trusted communication matrix 714.

In this example, the integrated EaaS server engine 706 is operatively linked to an entropy source 720, comprising one or more noise sources 766 which provide the non-deterministic, entropy-providing activities. The one or more noise sources may illustratively comprise, but are not limited to, a quantum random number generator device (QRNG), random thermal noise measured from ring oscillators or diodes or similar, or like sources known in the art. As each individual noise source may be contaminated by a small amount of bias, the entropy collected from each source can be combined and processed by a given cryptographic engine 711 (i.e. applying conditioning functions such as those described in the NIST SP800-90 family of documents) to create higher quality entropy data. The cryptographic engine 711 securely feeds the entropy data back via a data channel diode to the integrated EaaS server engine 706.

To assess the quality of the entropy produced by the noise source, the data is also continuously transmitted via another data diode 718 to an integrated health monitoring processing engine 726 that does health monitoring of the noise source using a series of statistical tests, such as the NIST SP 800-90B tests, for example. In the case where the entropy data fails one of these tests, the integrated processing engine 726 can send a failure signal back to the integrated EaaS server engine 706 to alert the system that the entropy data is compromised.

In the illustrated embodiment, in order to implement the health-monitoring function, an intervening channel resource comparator 722 is interposed between health monitoring engine and noise source outputs. For example, where the health monitoring engine outputs the same noise value it received as input, the comparator will allow the signal to go through to the EaaS server engine 706, otherwise, the comparator error output will flag the EaaS server engine 706 as to the inadequate EaaS value(s).

As will be appreciated by the skilled artisan, the illustrated embodiment is compatible with open source EaaS programs such as Pollen and Pollinate used to transmit and fetch entropy data. As in previously described embodiments, the integrated system described herein is controlled via a unified configuration and management interface. This interface can also be used to efficiently manage both the central deployment of software patches and security updates.

Figure 8:
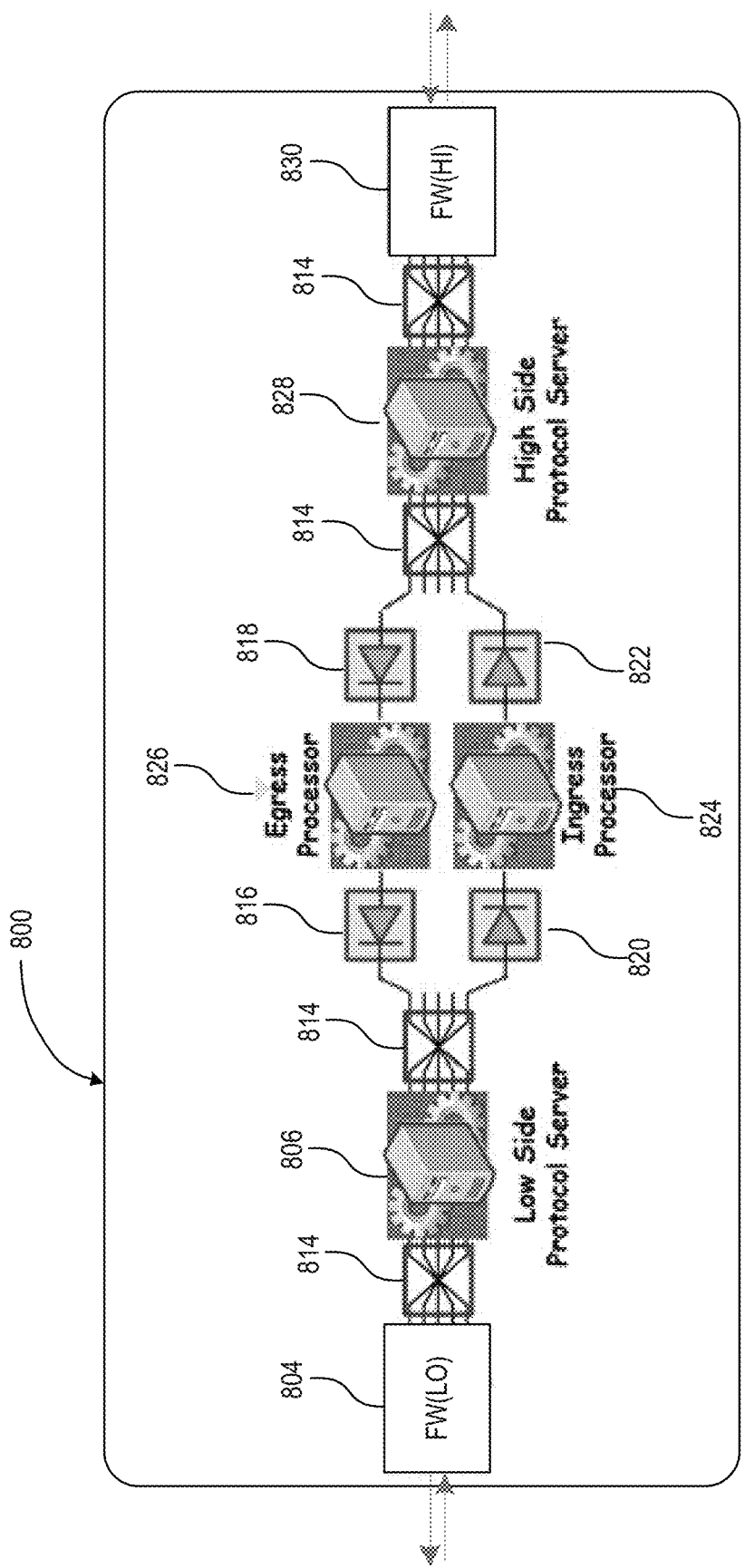
FIG. 8 is a schematic diagram of a Smart Data Diode, as implemented within a single security processing appliance and in accordance with another exemplary embodiment, for efficiently and securely isolating network traffic originating from outside a trusted network (the egress) from network traffic originating from inside the trusted network (the ingress)

FIG. 8 provides a schematic representation a Smart Data Diode (SDD) 800, in accordance with another exemplary embodiment. The SDD, as illustrated, can efficiently and securely isolate network traffic originating from outside a trusted network (the egress) from network traffic originating from inside the trusted network (the ingress). In contrast to the usual implementation of a data diode system, which provides a single unidirectional barrier between networks, the present embodiment integrates two physically separated unidirectional barriers within a single security processing appliance (SPA). As designed, the smart data diode can process both the Egress and Ingress traffic while isolating each of them behind separate data diodes.

As shown in FIG. 8, a low side (untrusted network) connection first goes through a low side firewall ($FW_{LO}$) 804 to an integrated Low Side Protocol Server (LSPS) 806 while a High Side (trusted network) connection goes through a High Side Firewall ($FW_{HI}$) 830 to an integrated High Side Protocol Server (HSPS) 828. Each connection to and from the integrated Protocol Servers 806 and 828 are made via a trusted communication matrix 814, as described above. The matrix can again be implemented as a set of static hardware relays and/or logic, and/or dynamically implemented via reconfigurable hardware logic and/or relays. It will be appreciated that while the matrix 814 is illustratively replicated throughout the SPA schematic, a same central or hub matrix 814 may be commonly implemented to effectively interconnect the illustrated components in hardware, as described above.

In the illustrated embodiment, communication between the HSPS and the LSPS are physically separated between the Ingress and Egress. Each process transits via an integrated processor (Egress Processor 826 and Ingress Processor 824) coupled on both sides by a data diode. This ensures that the processing of the ingress traffic is restricted to Low Side to High Side communication (via diodes 820 and 822) while the egress traffic is restricted from the High Side to Low Side communication (via diodes 816 and 818). These integrated components guarantee a physical separation in hardware of the Egress and Ingress traffic processing, all within the context of an integrated SPA. This integration can also enable the use of a unified configuration and management interface, which can in part be used to efficiently manage both the central deployment of software patches and security updates.

Figure 9:
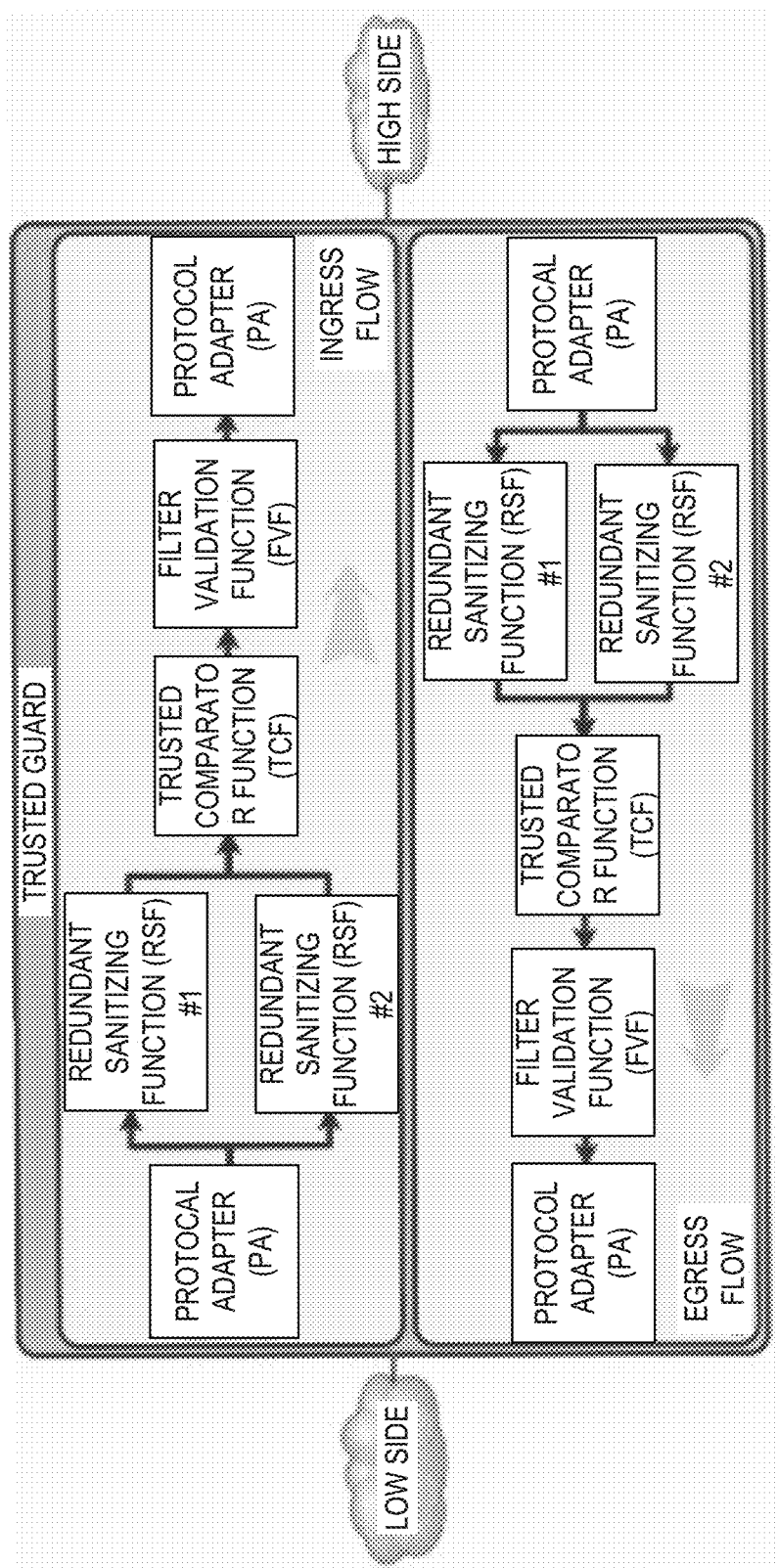
FIGS. 9 to 11 are schematic diagrams of exemplary embodiments of a Trusted Data Guard system executable within the context of a single security processing appliance, for separating an Egress traffic flow from an Ingress traffic flow, and for each implementing a series of inline validation and sanitizing functions.
Figure 10:
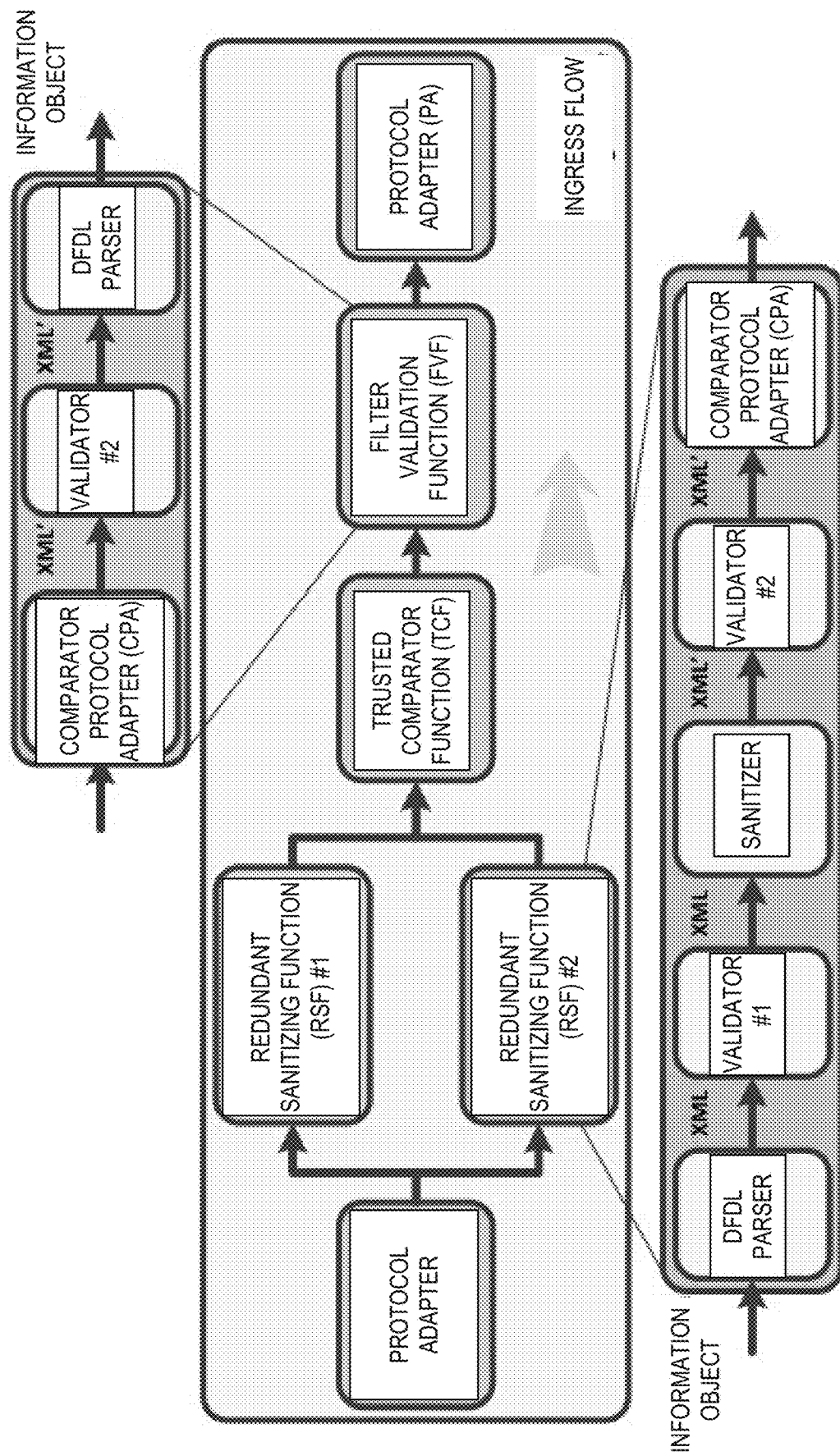
Figure 11:
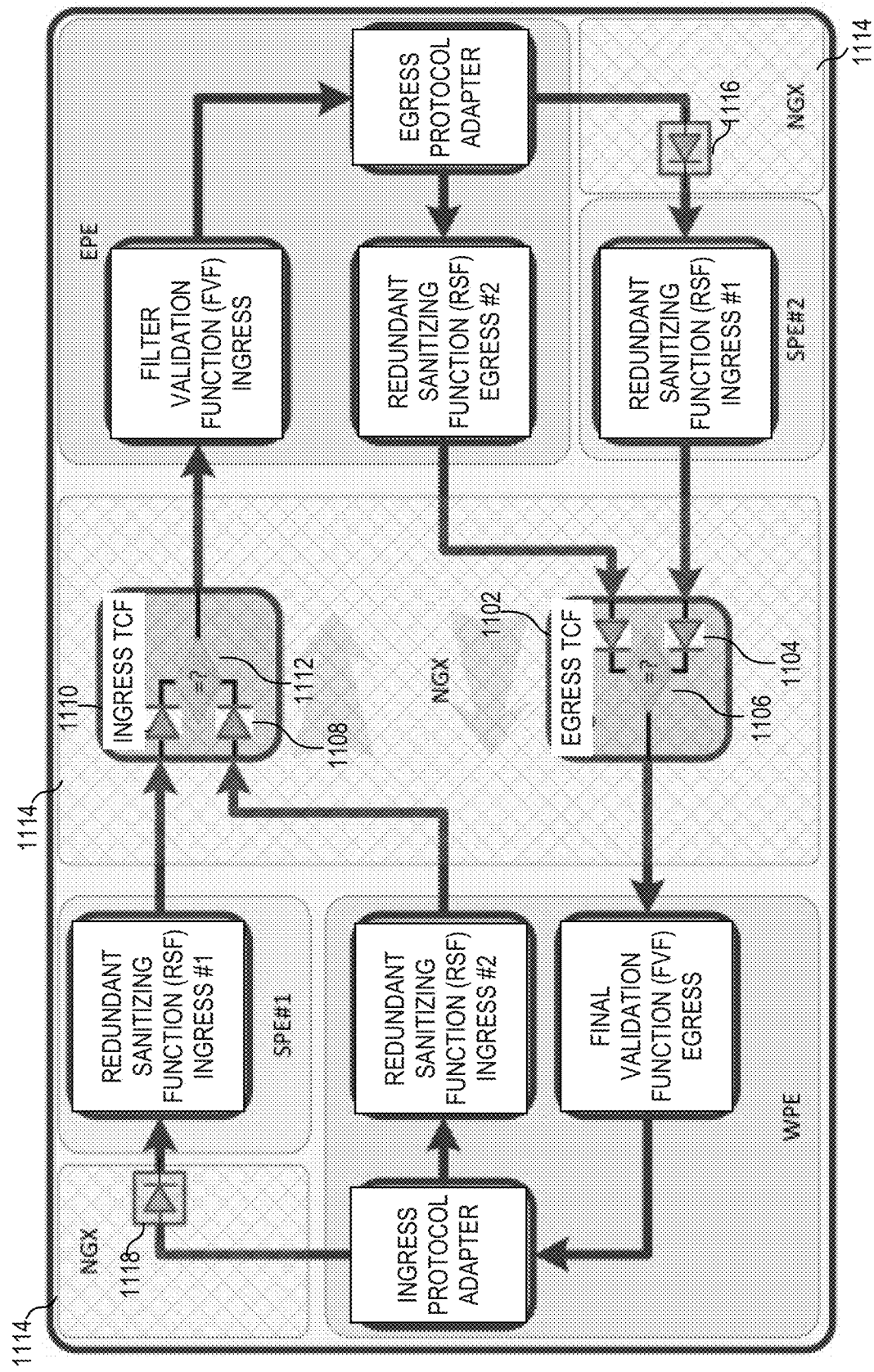

FIGS. 9 to 11 schematically illustrate an exemplary embodiment of a Trusted Data Guard system executable within the context of a single SPA, as defined above. For example, as shown in FIG. 9, a Trusted Guard physically separates an Egress traffic flow from an Ingress traffic flow, and for each implements a series of inline validation and sanitizing functions. The following description applies both for the Ingress traffic (going from the Low side to the High side) and the Egress traffic (going from the High side to the Low side).

The data is first processed by a Protocol Adapter (PA) which extracts information objects from the transmission protocols. These information objects can consist of a fixed format data object such as Military VMF (Variable Message Format), US MTF (US Military Text Format), JSON, XML, OTH Gold (Over The Horizon) or similar. The PA also implements different communication protocols such as SFTP, HTTP/HTTPS, Raw UPD/TCP, serial protocols or similar. After extracting the necessary data, the PA sends the data to two independent implementations of a Sanitizing Function. These functions implement a sanitizing algorithm, which removes malicious data from the input. The implementation of each function is independent, which means that they can be written in different programming languages (such as SWIFT, .Net C#, Java or similar), use different component libraries (such as Daffodil, Xerces, SAXON, libXML, Xalan, libXSLT or similar) or even be executed on different operating systems (such as Linux, SELinux, OpenBSD, Windows or similar).

The two independent implementations must arrive at the exact same result. To do this, both Sanitizing Functions send their output to a Trusted Comparator Function (TCF), which compares the two streams of data. The streams may be of any length and if any portion of the streams fails to compare, the TCF completely discards the data. If both data streams are exactly the same, the TCF sends the data to a Filter Validation Function (FVF), which executes the final verification of the information objects format and re-format the objects into an appropriate native format. The treated data objects are finally sent to an outgoing Protocol Adapter, which again translates the information objects into the right transmission protocol before forwarding it.

FIG. 10 shows in more detail the components of the Redundant Sanitizing Function (RSF) and the Filter Validation Function (FVF). In the case of the RSF, the information object is first processed by a DFDL (Data Format Description Language) parser to generate a XML formatted data object, which is read by a first validator function (Validator #1) to determine if the data is in proper form. The validated data object is then processed by a sanitizing function (Sanitizer) to remove malicious data and processed again by another validation function (Validator #2). Finally, the data object is sent to the Comparator Protocol Adapter (CPA) which finally transfers it to the TCF function. In the case of the Filter Validation Function (FVF), the data object is first received from the TCF function via a CPA, which forwards it to a validation function (Validator #2) before sending it to the DFDL Parser function.

FIG. 11 shows one possible implementation of the system described in FIGS. 9 and 10 within the context of a SPA. The integrated embodiment of FIG. 11 comprises an integrated (intelligent) switch (NGX) 1114, schematically shown here to encompass various channel resources as noted above, to interface between various integrated SPA components. As with previous embodiments, it will be appreciated that a same interconnecting hardware switch 1114 may be implemented within this design to implement the various functions illustrated herein, as can distinct hardware switches be cooperatively designed.

For both Ingress and Egress data flows, the NGX unit implements the TCF in hardware as a channel data comparator (comparators 1106 and 1112 for Egress and Ingress respectively). The channel data comparator implements logic between channels based on a comparison of data being channeled thereon, for example, allowing process throughput only upon matching channel data, thereby implementing the full functionality of the described TCF. For both the Egress and Ingress traffic, the incoming data objects from RSF #1 and RSF #2 are funneled through a data channel diode to ensure that the data flow is restricted to data going from the RSF to the TCF. This is shown in FIG. 11 for the Egress as the data objects coming from RSF #1 is sent via data diode 1104 while the objects coming from RSF #2 are funneled through data diode 1102, both connected to the channel data comparator 1106. Similarly, for the Ingress traffic, the data objects from the RSFs is sent via data diodes 1110 and 1108 to channel data comparator 1112. The NGX unit also implements, for both Egress and Ingress, through the use of data diodes the functional connection between the PA and one of the two RSF. FIG. 11 shows that the Egress traffic passes through data diode 1116 when going form the PA to the Egress RSF #1 and that the Ingress traffic goes through data diode 1118 when moving from the PA to the Ingress RSF #1.

Figure 12:
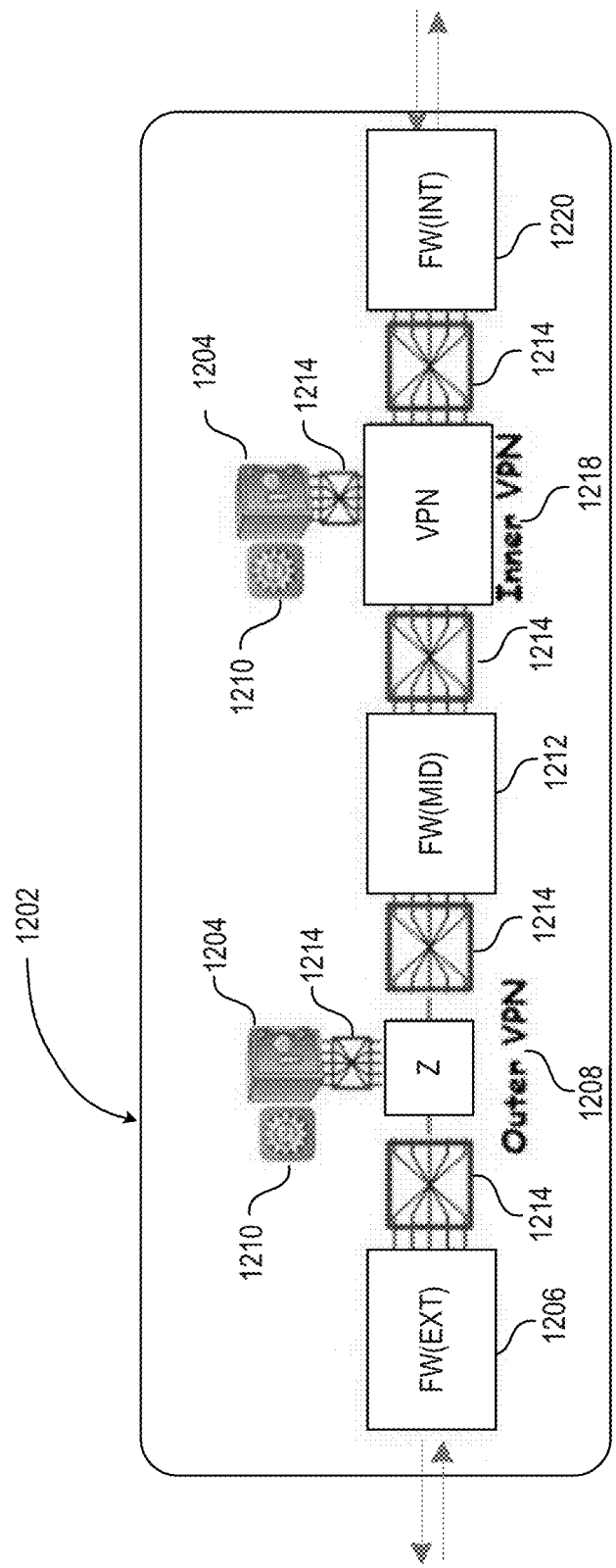
FIG. 12 is a schematic diagram of a dual-layer Virtual Private Network (VPN) system executable within the context of a single security processing appliance, in accordance with one embodiment.

FIG. 12 provides another exemplary implementation of an integrated security processing appliance as described herein, for the implementation of a Dual Layer Virtual Private Network (VPN) 1202. In this example, two connected VPNs and associated firewalls are integrated into a single hardware SPA. Network traffic from a local network is first routed through an internal firewall (FW$_{INT}$) 1220 to an integrated processing resource linked to a third party or open source VPN referred here as the Inner VPN 1218. This VPN is itself operatively linked to what is referred to as the Outer VPN, which consists of an inline channel encryption resource 1208. Each VPN (Outer and Inner) is operatively linked through hardware to a corresponding port-specific hardware storage resource and key space 1204 by means of trusted communication matrix 1214 in which secured port-specific cryptographic data can be stored and retrieved to execute one or more cryptographic processes via an integrated cryptographic engine 1210. The Outer VPN is itself connected to the outside network via an external firewall (FW$_{EXT}$) 1206. Each connection to and from each VPN is routed through a trusted communication matrix 1214, implemented as a set of static hardware relays and/or logic, and/or dynamically implemented via reconfigurable hardware logic and/or relays. A unified configuration and management interface can again also be used to efficiently manage both the central deployment of software patches and security updates, for example.

Figure 13:
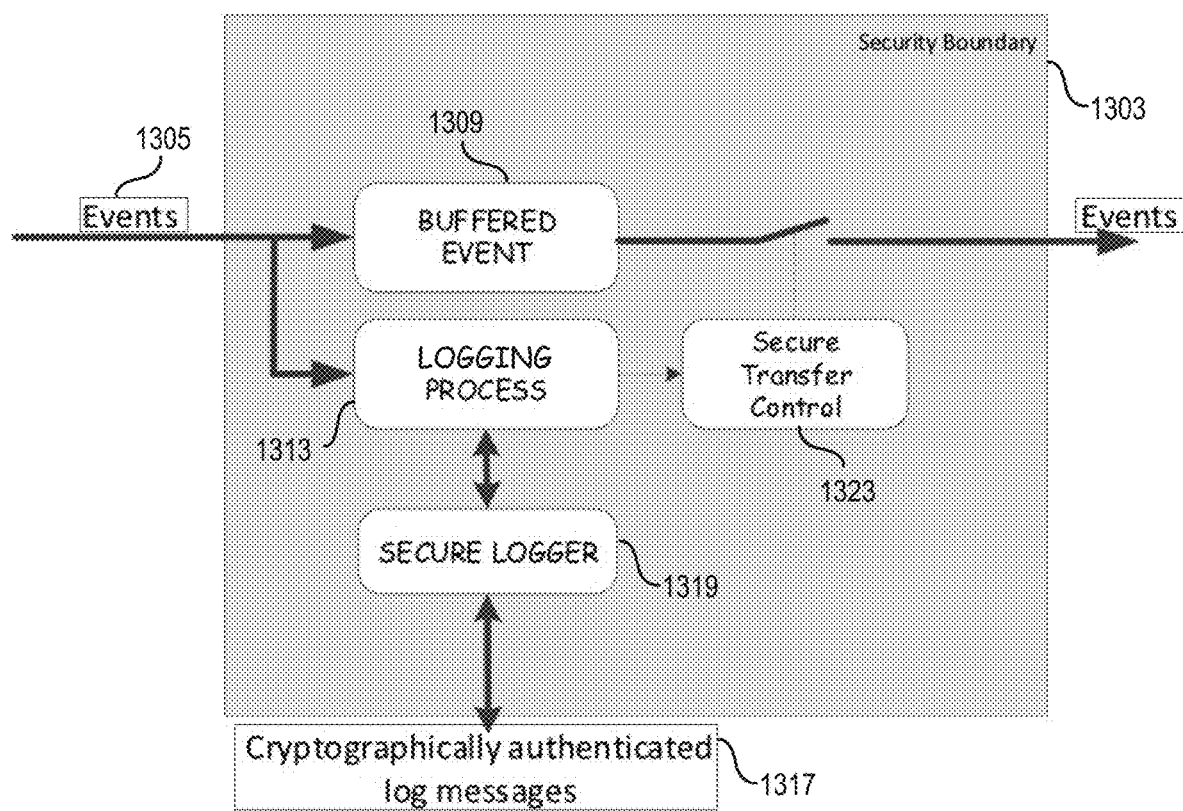
FIG. 13 is a schematic diagram of a trusted auditing system executable within the context of a single security processing appliance, in accordance with one embodiment.

With reference to FIG. 13, and in accordance with one embodiment, an example of a trusted auditing system executable within the context of a single SPA, as defined above, will now be described. In this exemplary embodiment, an incoming transaction event 1305 that must be audited is received by the HSM 1303 via a hardware port-specific channel and securely stored in an internal buffer 1309 or encrypted and sent off to be buffered elsewhere in the system. Logging process 1313 proceeds to audit the content of event 1305 and produces an external cryptographically authenticated audit log message 1317 via a secure logger function 1319. Upon completion of the audit log entry 1317, event 1305 will either be released from an internal buffer or the decryption key will be released to the system buffer 1309 to be processed by other segments of the system via secure transfer control 1323. While this example is illustrated in isolation in FIG. 13, it can readily be applied as an inline or addressable channel resource through designated configuration of an associated interconnection matrix and/or appliance resources. For instance, a channel auditing function may be invoked and implemented by one of the SPA's processing engines, or again wholly or in part relayed to an external resource via an appropriate hardware link and/or data port. This may, in part, depend on the complexity of the auditing process (e.g. basic cryptographic data logging via onboard cryptographic resources vs. more elaborate data channel filtering, validation, authentication and/or related processes) and resources required therefor. Likewise, while a single channeling auditing process and/or resource may be implemented within a given appliance, multiple distinct hardware segregated auditing resources may also or alternatively be deployed depending on the application at hand.

Figure 14:
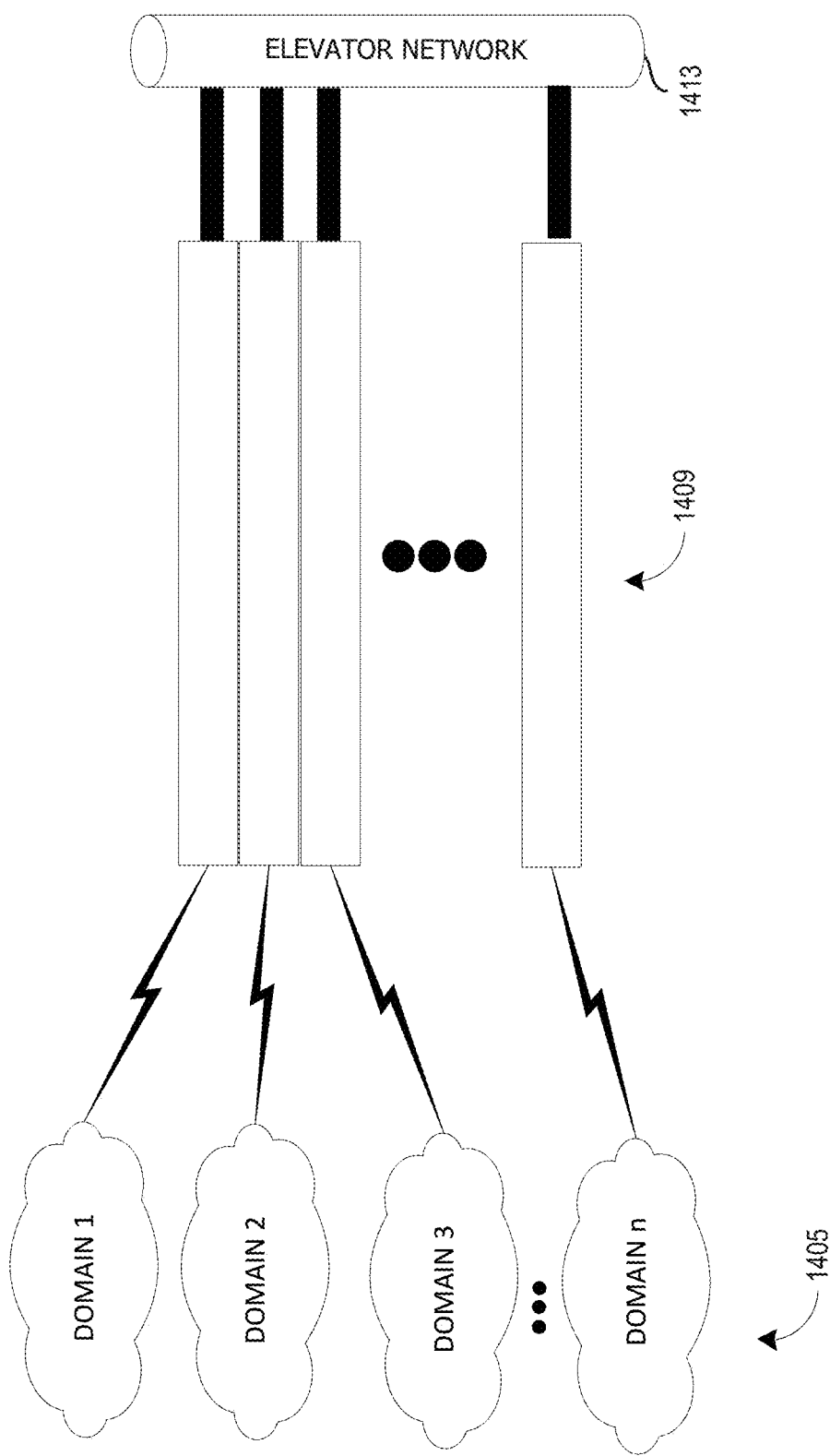
FIG. 14 is a schematic representation of a Cross-Domain Solution (CDS) enforcement point based on one or more security processing appliances (SPAs) configured in a CDS mode of operation (SPA-CDS), in accordance with one embodiment.

With reference now to FIG. 14 and in accordance with one embodiment, a high-level schematic representation of a Cross-Domain Solution (CDS) enforcement point based on one or more SPAs configured in a CDS mode of operation (hereafter referred to as SPA-CDS) will now be described. As shown in FIG. 14, a multiplicity of domains 1405 are each operationally connected to one of a corresponding multiplicity of SPA-CDS 1409. It will be appreciated that while a one-to-one architecture is illustrated herein to address multiple network security domains (zones), multiple zones may alternatively be wholly integrated within a single SPA (e.g. where greater processing density, resources, multiplicity and/or volumes are made available within a particular SPA embodiment), as can security processes involved in the processing of a same domain (zone) be split or distributed across multiple SPAs.

In the illustrated embodiment, each SPA-CDS is further operationally connected to one another via a secure interface to a cross-domain network, illustratively referred to herein as "Elevator network" 1413. Elevator network 1413 is an interconnect point that allows the SPA-CDS devices, each dedicated in this example to its own specific corresponding security domain, to transfer encrypted data that can only be delivered to a specific destination security domain. In other words, network 1413 may act as an "elevator shaft" where domain-specific data, which is correspondingly encrypted for domain specificity, enters on a specific floor (i.e. security domain) and can either be elevated or lowered to another specific destination floor and only successfully decrypted (processed) thereon based on said domain specific encryption.

Figure 15:
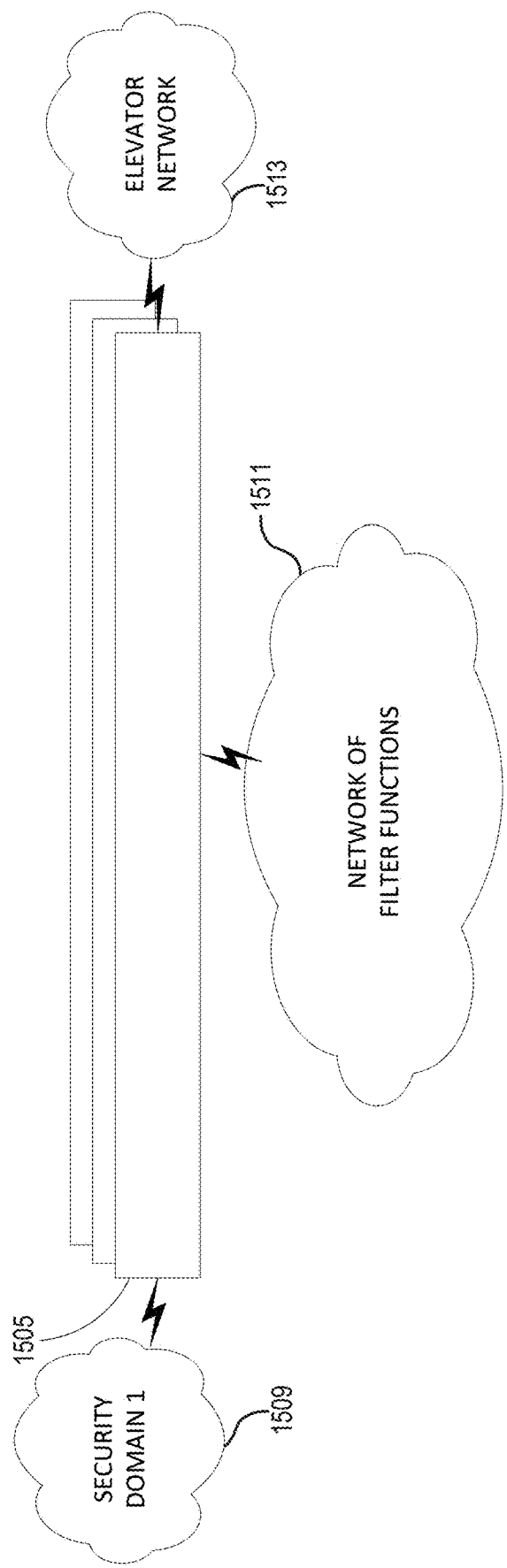
FIG. 15 is a schematic representation of three separate network interfaces of an illustrative SPA-CDS, in accordance with one embodiment.

In some embodiments, each SPA-CDS may also interface to a third private network only visible to those SPA-CDS that are members of a given security domain. This is illustrated in FIG. 15, where SPA-CDS 1505 provides three separate network interfaces: the security domain 1509, the filtering function network 1511 and the elevator network 1513. Filtering function network 1511, in this example, is host to one or more servers performing a variety of filtering processes. Each one of the filter processes available for a given security domain is specifically defined to perform the necessary information filtering required for information being transferred between specific security domains. Note that a SPA-CDS only enforces the requirement that all data being transferred from one domain to another has to pass through a filtering step, by ensuring the data must pass through the filtering process. The skilled artisan will understand that the actual specifics of what the filtering process does may be outside of the scope of SPA-CDS, as can other embodiments encompass internal filtering applications and/or engines as the case may be.

Figure 16A:
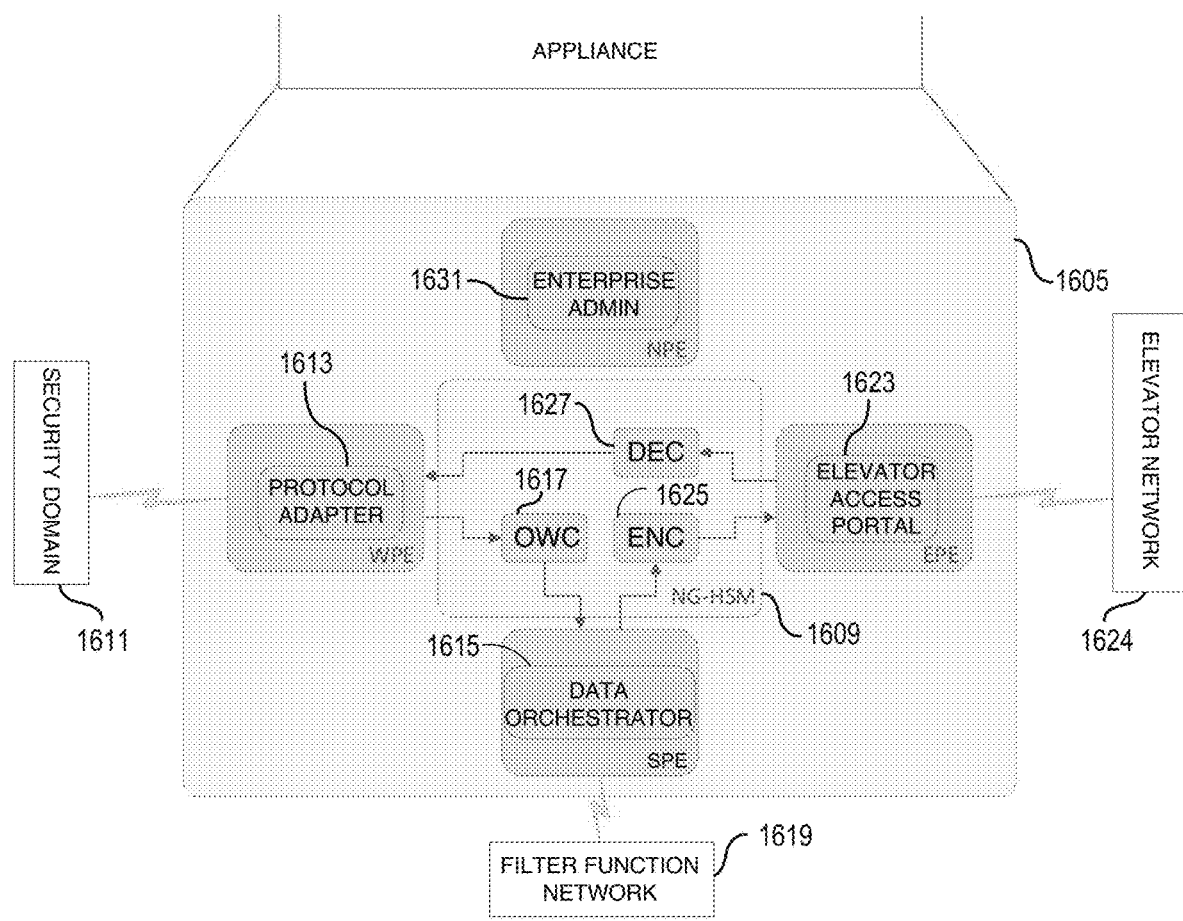
FIGS. 16A to 16C are schematic representations of a Universal Cyber Security Platform (UCSP) or SPA configured as an exemplary implementation of the SPA-CDS of FIGS. 14 and 15, in accordance with one embodiment.
Figure 16B:
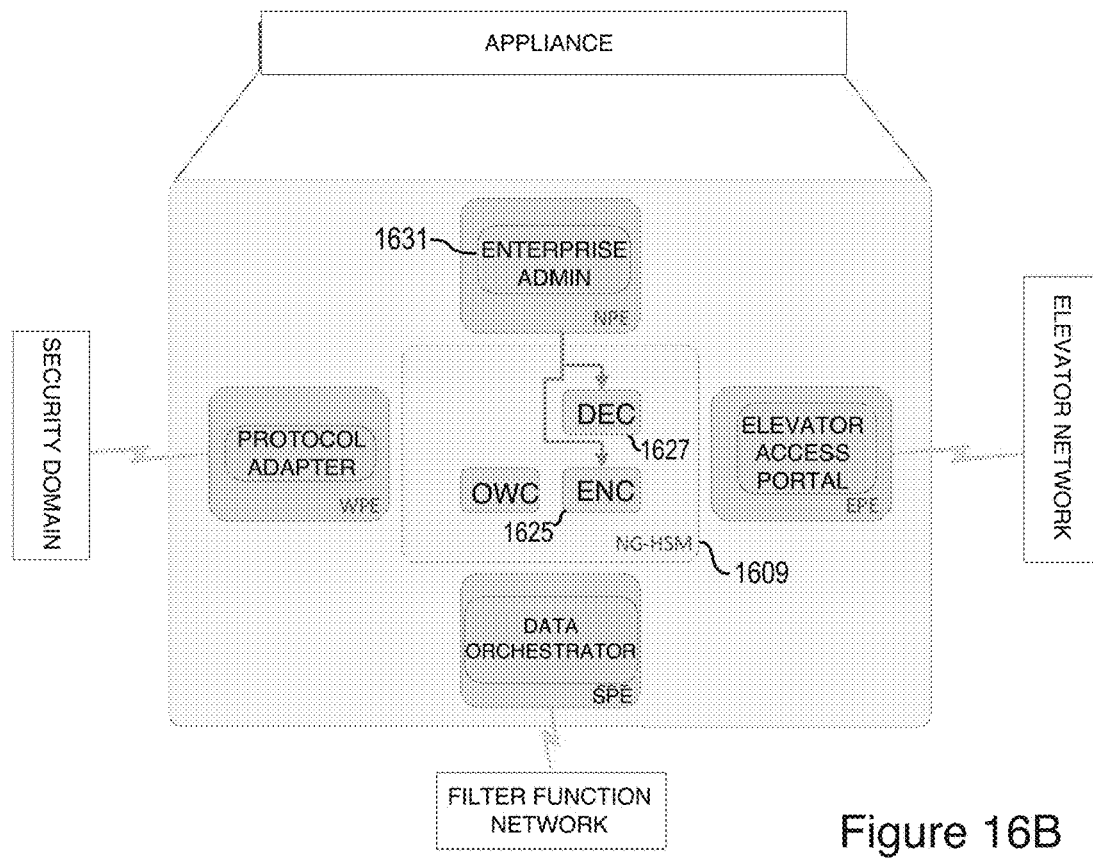
Figure 16C:
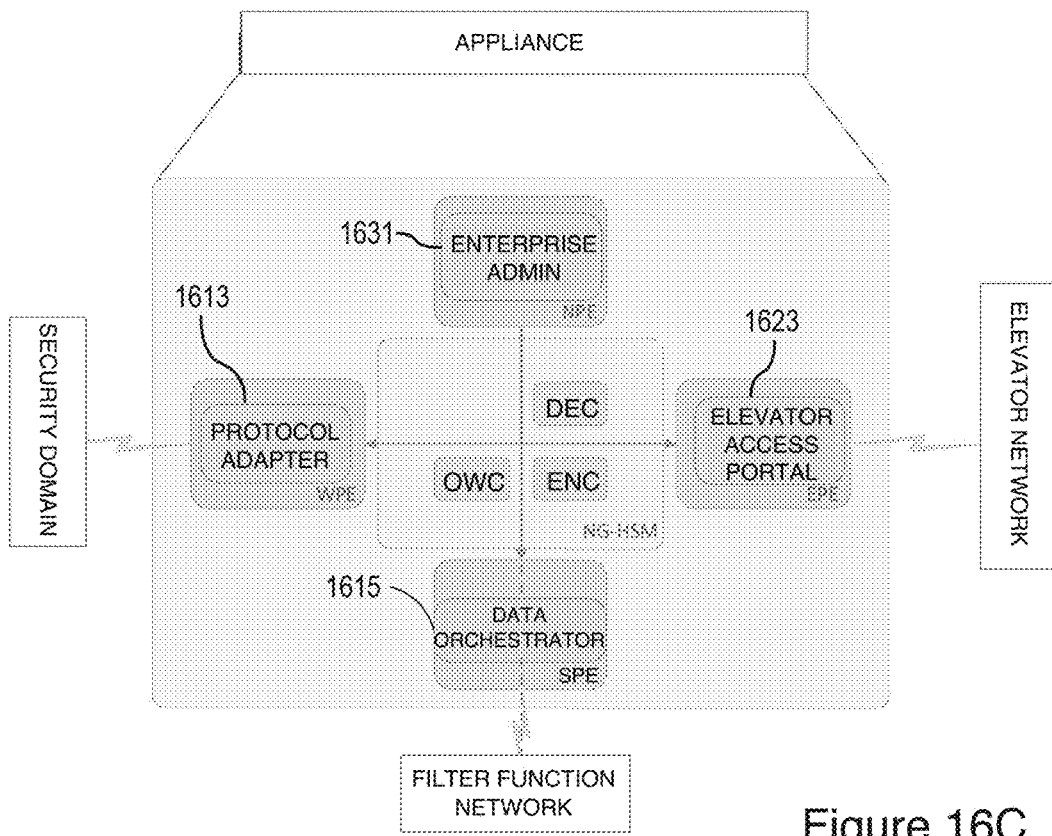

With reference to FIGS. 16A to 16C, different examples of a Universal Cyber Security Platform (UCSP) using the above-described SPA-CDS will now be described. In the exemplary embodiment of FIG. 16A, each SPA-CDS 1605 appliance comprises four independent processing engines (PE—herein labelled as WPE, SPE, EPE and NPE) interconnected using described multiport HSM 1609, as illustratively described above. In this example, upon a SPA-CDS 1605 being turned on, HSM 1609 boots itself from code that is kept secure via active-tamper security mechanisms and a secure boot procedure. Once securely running, HSM 1609 proceeds to securely boot each of the UCSP processing engines with specific application capabilities. The UCSP then transitions to an operational state that performs the functionality it has been programmed to enforce. The UCSP augments the HSM's active tamper security capabilities with additional platform-level tamper detection mechanisms to ensure that the entire appliance is fully tamper resistant.

In some embodiments, each of the PEs may be implemented using single board computers based on Intel™ server-class processors running a security-hardened operating system and related application code. The specific application performed by the various PEs may be defined by the overall use-case enforced by the UCSP.

In some embodiments, the HSM combines the trusted communication matrix with a quantum-ready component that provides generic cryptographic functions, which it enhances via a quantum-ready security framework built using post-Quantum cryptographic algorithms for things such as secure firmware and configuration updates.

In some embodiments, the HSM's trusted communication matrix strictly enforces communication flows and types between the PEs deployed in the UCSP. The types of communication flows may be bi-directional, uni-directional, filtered, encrypted, decrypted or similar. Furthermore, flows of communication between any two PE may also be completely blocked if the overall use case requires it.

With particular reference to FIG. 16A, the SPA-CDS 1605 provides a Cross Domain Security solution based on a UCSP that implements a specific trusted communication matrix configuration and set of processing engine (PE) functions. As illustrated in FIG. 16A, information is first transferred from a source element in security domain 1611 to the SPA-CDS interface attached to that security domain. Within the SPA-CDS, the information is received using Protocol Adaptor (PA) function 1613, which is responsible to provide an appropriate protocol hand-off for the information. Protocol Adaptor 1613 runs on one of the multiple SPA-CDS processing engines (WPE in FIG. 16A). Once protocol adaptor 1613 has extracted a complete or partial unit of information deemed sufficient to be filtered and transferred to another domain, it pushes the unit of information onto Data Orchestrator (DO) 1615, which resides on a second independent processing engine of the SPA-CDS (SPE in FIG. 16A). This transfer is performed via One-Way Channel (OWC) 1617 enforced by the trusted communication matrix using, for example, a data diode or similar. Once a unit of information is received by Data Orchestrator 1615, it is operable to determine the appropriate filter or set of filter function(s) that may need to be applied to that specific type of information. Data Orchestrator 1615 proceeds to orchestrate the appropriate filtering steps using one or more filtering systems deployed on network of filtering functions 1619. Data Orchestrator 1615 may implement said one or more filtering function based on a wide range of criteria. For example and without limitation, a filtering function may be applied based on the content of the data being transferred; based on the meta-data of the data being transferred (e.g. headers or tags with information about the data); based on a time window (e.g. from an initial time and data to an end time and date); based on metering of data transactions (e.g. apply filter only for the first 1000 units of information received, for example). Accordingly, Data Orchestrator 1615, in some embodiments, may take the form of a cross-domain data validation engine, for example, operable to validate and thus approve (refuse) or seek approval for the data transaction to proceed to the next domain.

Upon having completed the necessary application of filters to the specific unit of information, Data Orchestrator 1615 then obtains the approval (or refusal) for furtherance of the given unit of information onto another destination security domain. This transition requires that Data Orchestrator 1615 transfers the specific unit of information to cross-portal (Elevator) Access Portal (EAP) 1623. EAP 1623 resides on a third independent processing engine (EPE) and is operationally connected to Elevator Network 1624. As before, the transfer between Data Orchestrator 1615 and EAP 1623 is performed via the trusted communication matrix. However, in this case, the trusted communication matrix enforces an encryption (ENC) transform 1625 that encrypts the specific unit of information for a given destination security domain using a specific cryptographic key assigned for that security domain. The encrypted data then gets delivered to EAP 1623 of the egress security domain which transfers it to the ingress EAP 1623 of the destination security domain. Upon receiving an encrypted unit of information from a source security domain, the ingress EPA 1623 pushes the encrypted unit of information to its local PA 1613. The transfer between EAP 1623 and PA 1613 is enforced by the ingress SPA-CDS HSM's trusted communication matrix. In this case however, the trusted communication matrix enforces a decryption (DEC) transform 1627 on the data. Upon receiving a decrypted unit of information from its local EAP 1623, the ingress SPA-CDS's PA 1613 for the destination security domain re-assembles the various units of information into a complete information package and transfers it off to a destination customer using the appropriate communication protocol.

The SPA-CDS may also provide an Enterprise Administrative (EA) function 1631 dedicated to the overall maintenance of the functions offered by each of the deployed SPA-CDS devices and residing on a fourth independent processing engine (NPE). One of these functions is the distribution of appropriate keying material of each ENC 1625 and DEC 1627 transforms specific to the corresponding security domain(s) of the destination/source SPA-CDS devices, as illustrated in FIG. 16B. For example, if a SPA-CDS deployed as the CDS access point for security domain 1 is to be only allowed to transfer information to security domain 2 and security domain 3, then the ENC 1625 function of that SPA-CDS would be pre-loaded with two specific transfer keys {$K_{1-2}$, $K_{1-3}$}. Similarly, if that same SPA-CDS is allowed to receive data from security domains {2, 3, 4}, then the DEC 1627 function would be pre-loaded with three specific transfer keys {$K_{2-1}$, $K_{3-1}$, $K_{4-1}$}.

The EA 1631 capability also provides an overarching maintenance function for all of the sub-components of the offered solution. In this way, when PA 1613, DO 1615, EAP 1623, or even EA 1631 require software updates, these functions are orchestrated by EA 1631, as illustrated in FIG. 16C. During a maintenance update, all of the various network accesses are disabled to allow the enterprise maintenance capability. This capability can be further extended to provide the maintenance and enterprise level management of the filtering functions dedicated to each deployed security domains. The types of communication protocols that can be handled by the SPA-CDS is dependent on the type of specific protocol adapters that are deployed on a given device. In general and without limitation, these can be both stream or packetized protocols.

The skilled artisan will understand that, in some embodiments, a different number of independent processing engines may be used from the four described above.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. An integrated network security appliance comprising:
    a hardware-integrated processing engine operable to implement a trusted network-related resource;
    an integrated digital data processor operable to execute said processing engine;
    an integrated data storage resource accessible to said processing engine to implement said trusted network-related resource;
    an integrated location sensor;
    an embedded hardware security module (HSM) hardwired to interface with said hardware-integrated processing engine via a dedicated hardware-isolated communication path, and operable to execute a trusted internal cryptographic process associated with said trusted network-related resource as a function of location data output from said integrated location sensor; and
    a trusted hardware switch having a plurality of hardware ports associated therewith and configured to define in hardware multiple hardware-isolated data communication paths embedded therein comprising said dedicated hardware-isolated communication path with said HSM;
    wherein said hardware-integrated processing engine comprises two or more hardware-integrated processing engines each operable to implement a corresponding network-related resource; and
    wherein each of said processing engines interfaces with at least one of said hardware ports in hardware so to route processing engine traffic therethrough along selected ones of said multiple embedded communication paths to operatively interconnect said processing engines through internal integrated hardware network connections while invoking, along said dedicated hardware-isolated communication path, said trusted internal cryptographic process as a function of said location data.

2. The integrated network security appliance of claim 1, further comprising a tamper-resistant housing in which each of said processing engine, said data processor, said storage resource, said location sensor and said HSM are operatively housed.

3. The integrated network security appliance of claim 1, wherein said location data is used to automatically detect uncharacteristic or unusual usage of the appliance.

4. The integrated network security appliance of claim 1, further comprising an integrated precision timing device, wherein said trusted internal cryptographic process is implemented by said HSM as a further function of precision timing data output from said integrated precision timing device.

5. An integrated network security zoning appliance operable to implement a network architecture having distinct network security zones, the appliance comprising:
    two or more hardware-integrated processing engines each operable to implement a corresponding network-related resource associated with a respective one of the network security zones;
    one or more integrated digital data processors operable to execute said processing engines;
    one or more integrated data storage resources accessible to said processing engines to implement each said corresponding network-related resource;
    an integrated location sensor; and
    an integrated multi-zone hardware security module (HSM) having a plurality of hardware ports associated therewith and configured to define in hardware multiple data routing paths embedded therein and operatively interconnecting said hardware ports;

wherein said HSM is hardwired via respective ones of said hardware ports to interface with respective ones of said processing engines to electronically receive input zone-specific cryptographic data therefrom to initiate execution of an internal cryptographic process as a function thereof and as a function of location data output from said integrated location sensor, via a cryptographic engine associated therewith;

wherein said HSM comprises two or more segregated hardware port-specific storage spaces each operatively linked to a corresponding one of said hardware ports via a corresponding hardware link, and storing respective secured zone-specific cryptographic data thereon exclusively retrievable as a function of said given input zone-specific cryptographic data corresponding thereto; and wherein said cryptographic engine is operable to execute said cryptographic process based on said secured zone-specific cryptographic data retrieved from said two or more segregated hardware port-specific storage spaces as a function of said given input zone-specific cryptographic data and said location data.

6. The integrated network security zoning appliance of claim 5, wherein said location data is used to automatically detect uncharacteristic of or unusual usage of the appliance.

7. The integrated network security zoning appliance of claim 5, further comprising an integrated precision timing device, wherein said internal cryptographic process is implemented by said HSM as a further function of precision timing data output from said integrated precision timing device.

8. The appliance of claim 5, wherein said HSM is implemented in a field-programmable gate array (FPGA).

9. The appliance of claim 5, further comprising a tamper-resistant housing in which each of said processing engines, said data processors, said storage resources and said HSM are operatively housed.

10. The appliance of claim 5, further comprising a common external administration interface to provide authorised external access to distinct zone resources in accordance with a designated multi-tier authorisation protocol, wherein selective access to designated ones of said zones is provided via said administration interface as a function of distinctly defined administrator access authentication profiles.

11. The appliance of claim 10, wherein said designated multi-tier authorisation protocol further defines a distinct administrative access permission for said HSM.

* * * * *

UNITED STATES PATENT AND TRADEMARK OFFICE
CERTIFICATE OF CORRECTION

PATENT NO. : 11,916,872 B2
APPLICATION NO. : 17/659647
DATED : February 27, 2024
INVENTOR(S) : Bruno Couillard et al.

It is certified that error appears in the above-identified patent and that said Letters Patent is hereby corrected as shown below:

In the Claims

In Column 33, Claim 6, Line 24 (Approx.), delete "of or" and insert --or--.

Signed and Sealed this
Eighteenth Day of June, 2024

Katherine Kelly Vidal
*Director of the United States Patent and Trademark Office*